Figure 15:
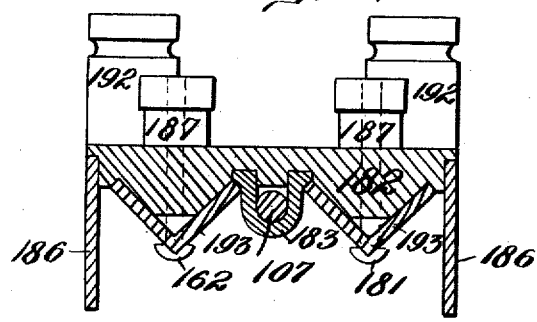

No. 843,473. PATENTED FEB. 5, 1907.
J. N. MAKLEY, E. F. MANETT & F. M. DANNELLY.
SWITCHING DEVICE.
APPLICATION FILED JULY 17, 1906.
12 SHEETS—SHEET 1.
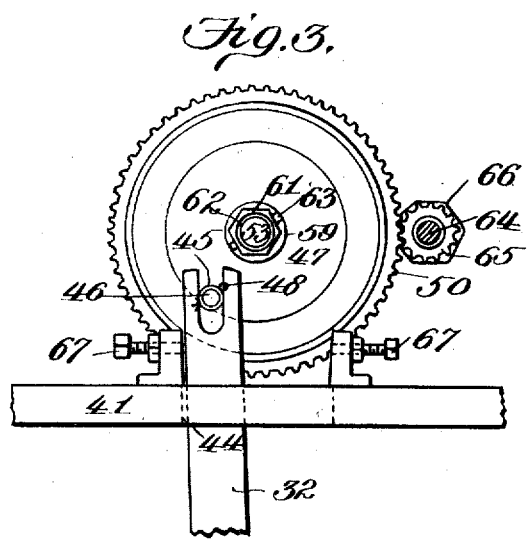
Fig. 3.
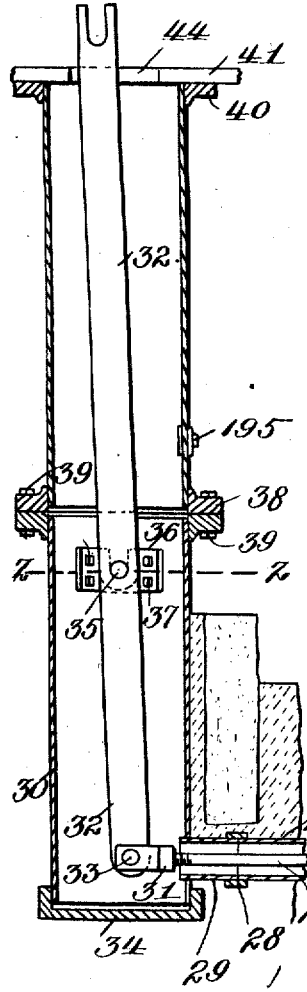
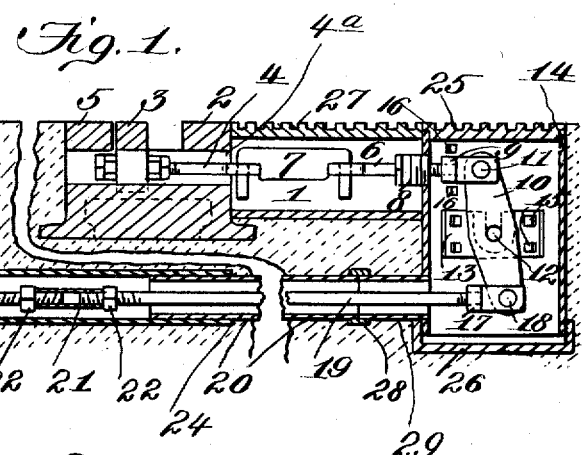
Fig. 1.
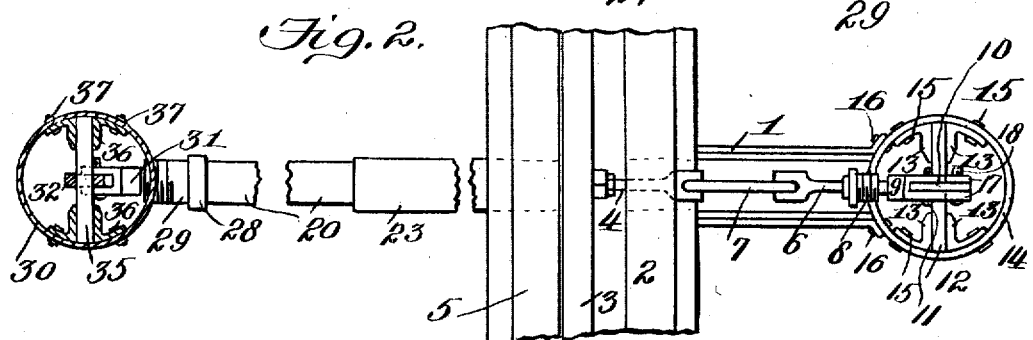
Fig. 2.
Witnesses:
C. D. Kesler
Inventors
John N. Makley
Edward F. Manett
Frank M. Dannelly
By James L. Norris
Atty.

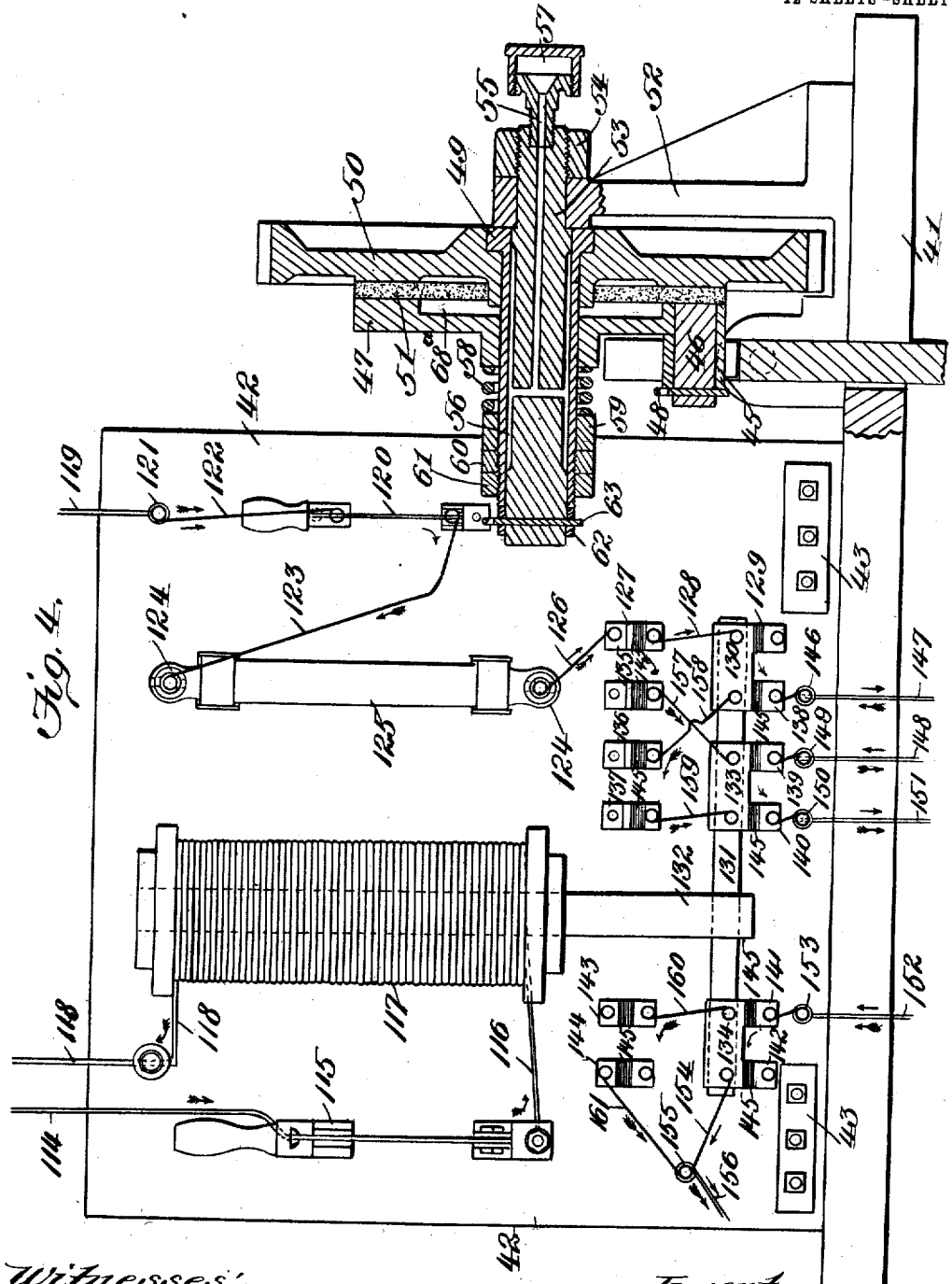

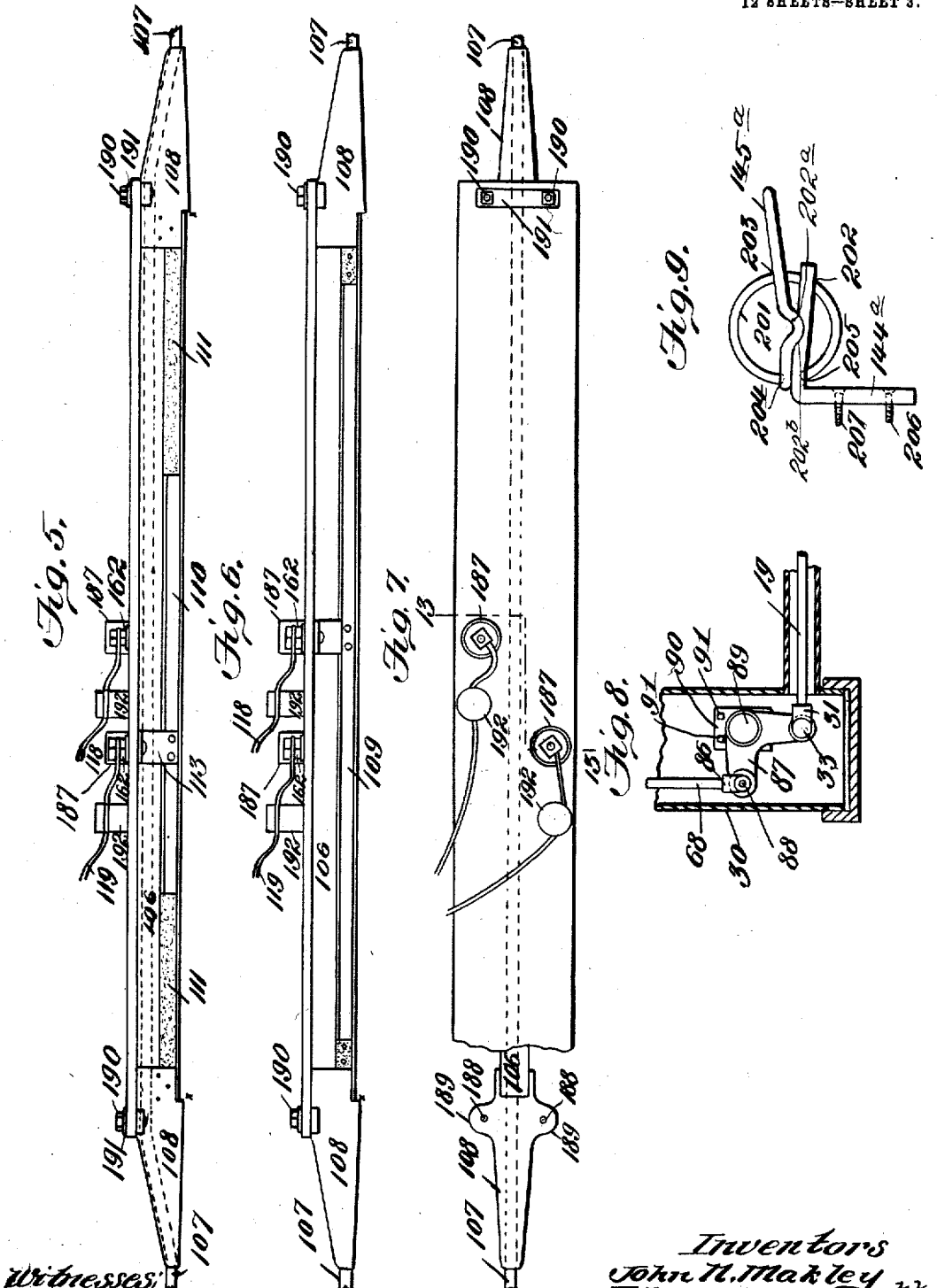

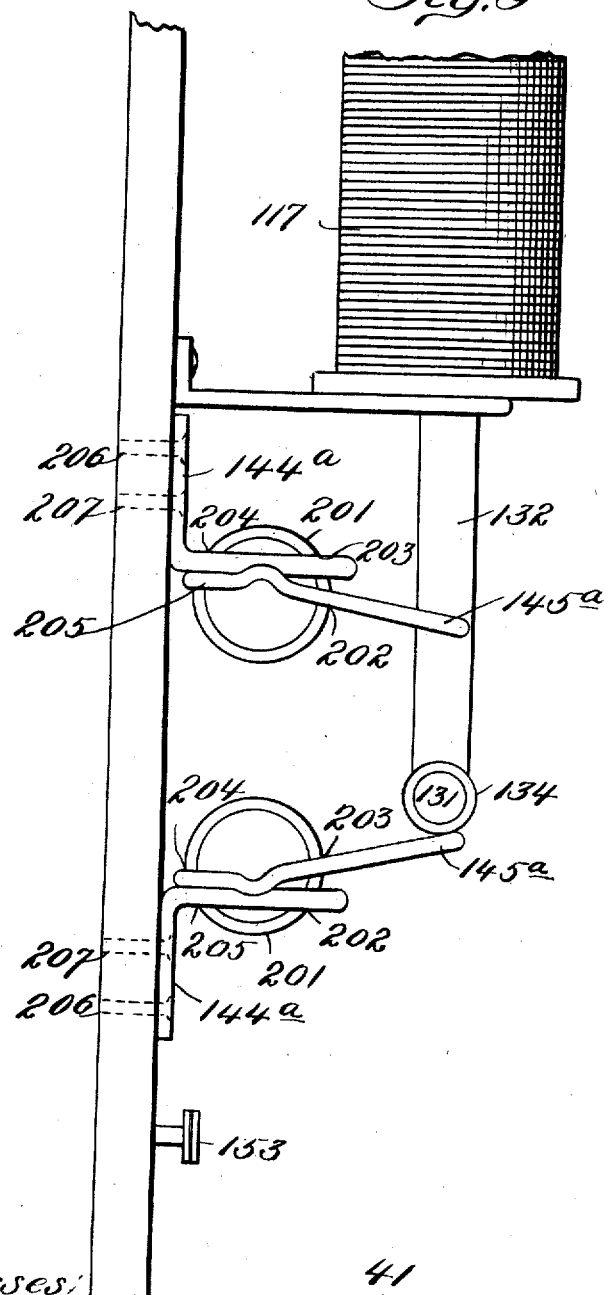

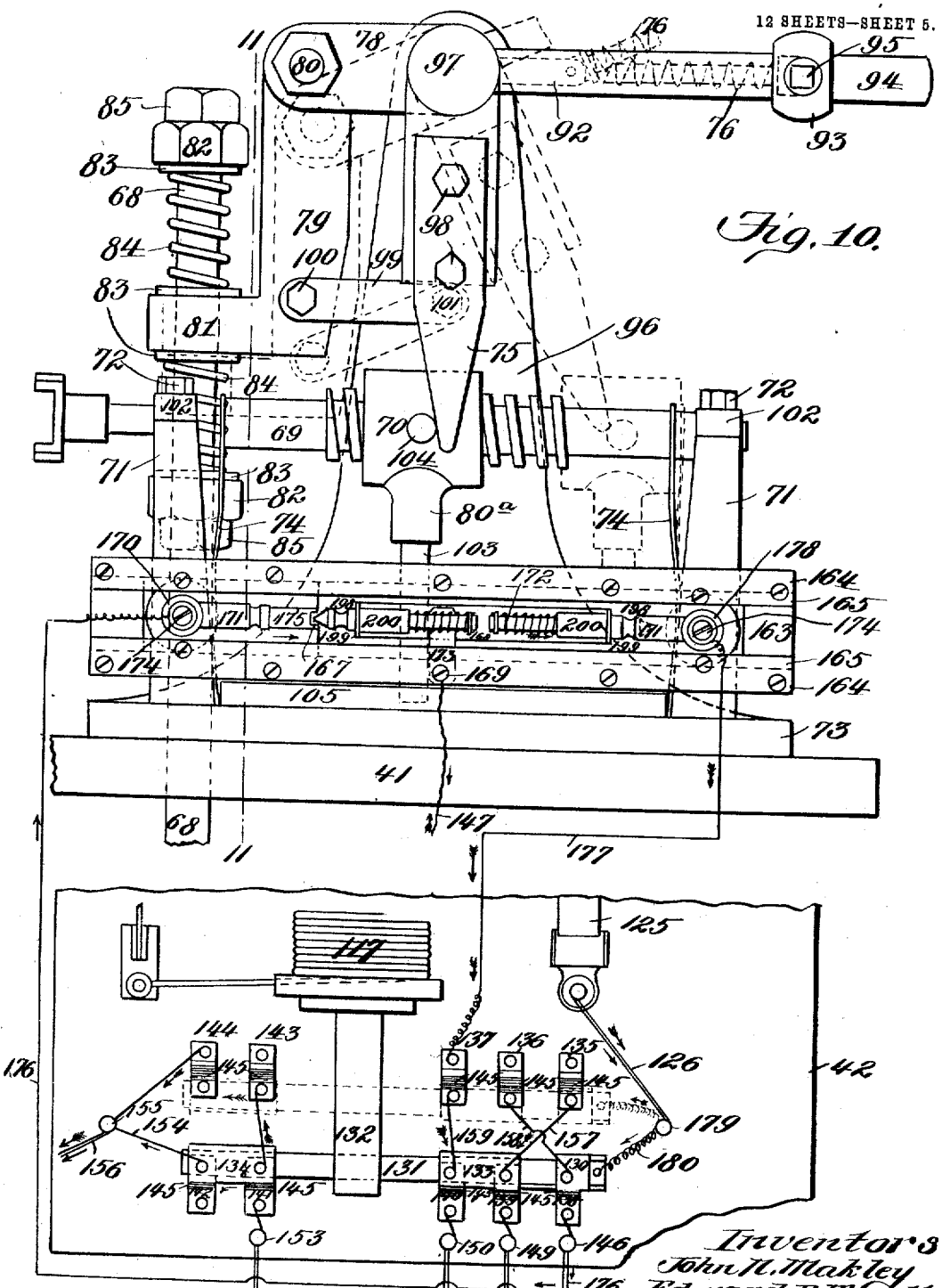

No. 843,473.  
PATENTED FEB. 5, 1907.
J. N. MAKLEY, E. F. MANETT & F. M. DANNELLY.  
SWITCHING DEVICE.  
APPLICATION FILED JULY 17, 1906.
12 SHEETS—SHEET 6.
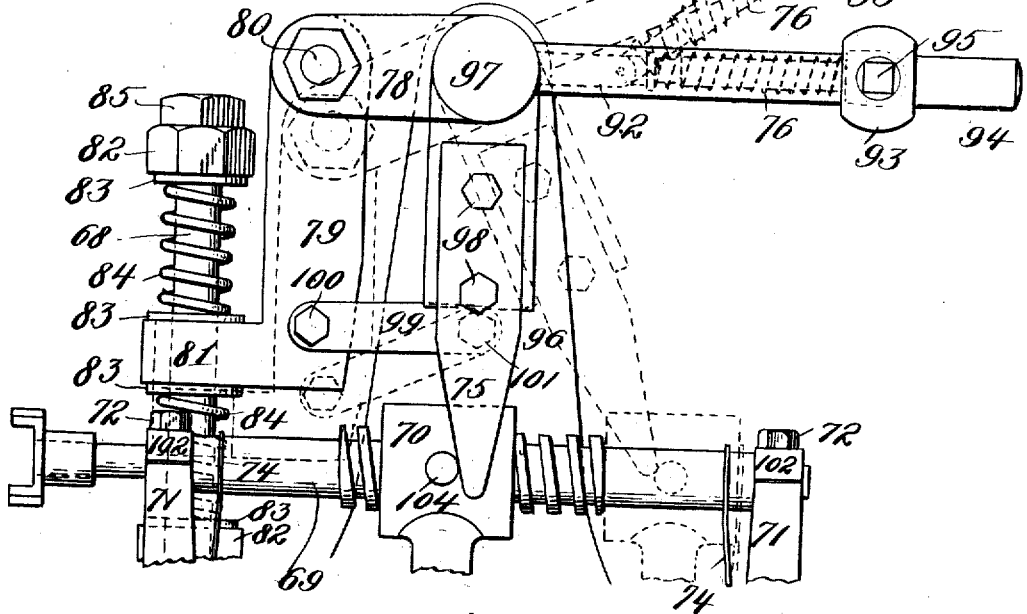
Fig. 10ᴬ
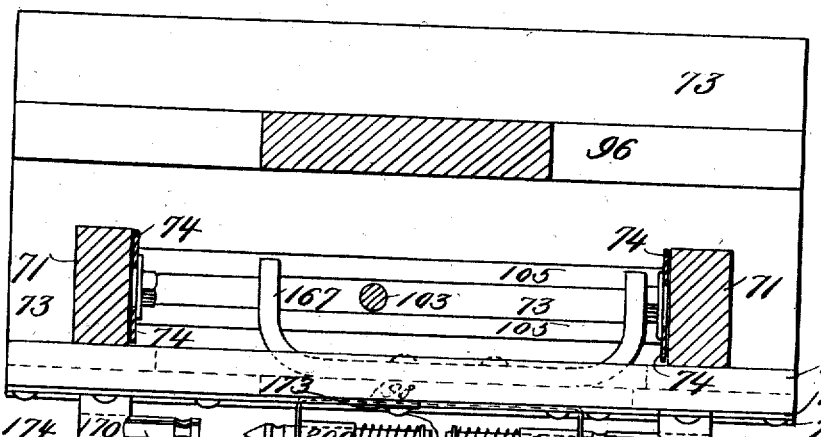
Fig. 10ᴮ
Witnesses  
Inventors  
John N. Makley  
Edward F. Manett  
Frank M. Dannelly  
By James L. Norris  
Atty.

No. 843,473. PATENTED FEB. 5, 1907.
J. N. MAKLEY, E. F. MANETT & F. M. DANNELLY.
SWITCHING DEVICE.
APPLICATION FILED JULY 17, 1906.
12 SHEETS—SHEET 7.
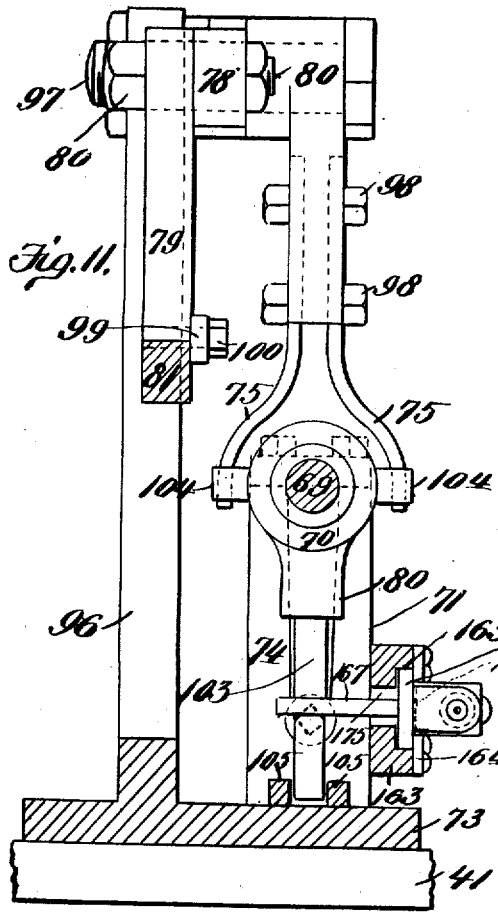
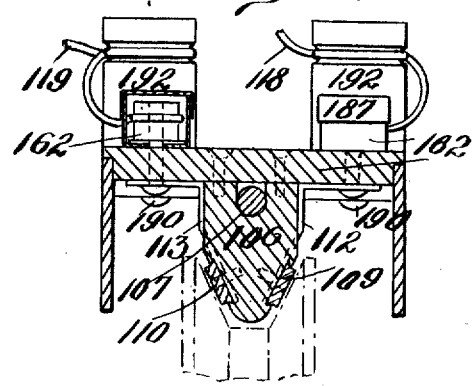
Fig. 13.
Fig. 14.
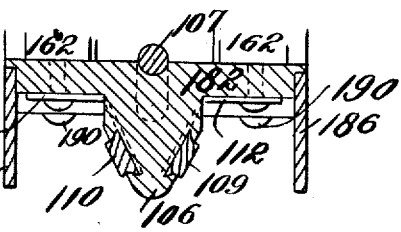
Fig. 11.
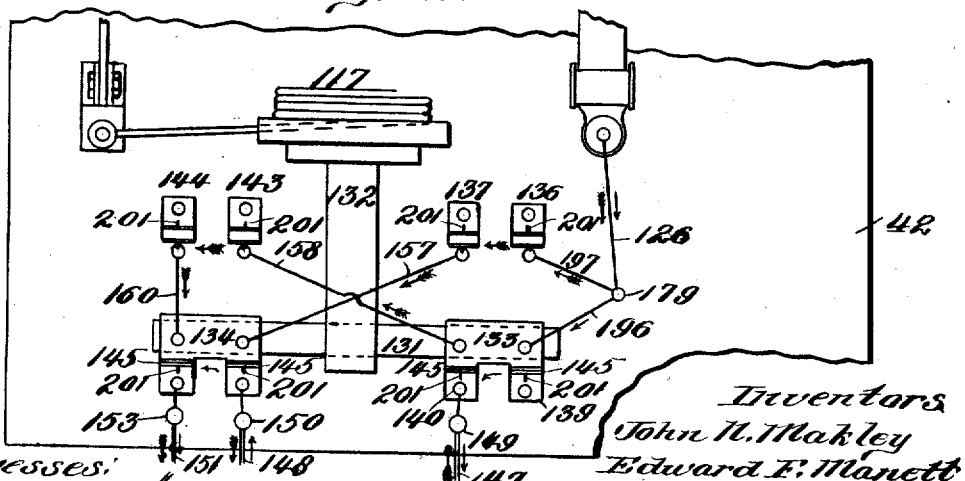
Fig. 12.
Witnesses:
Inventors
John N. Makley
Edward F. Manett
Frank M. Dannelly
By James L. Norris

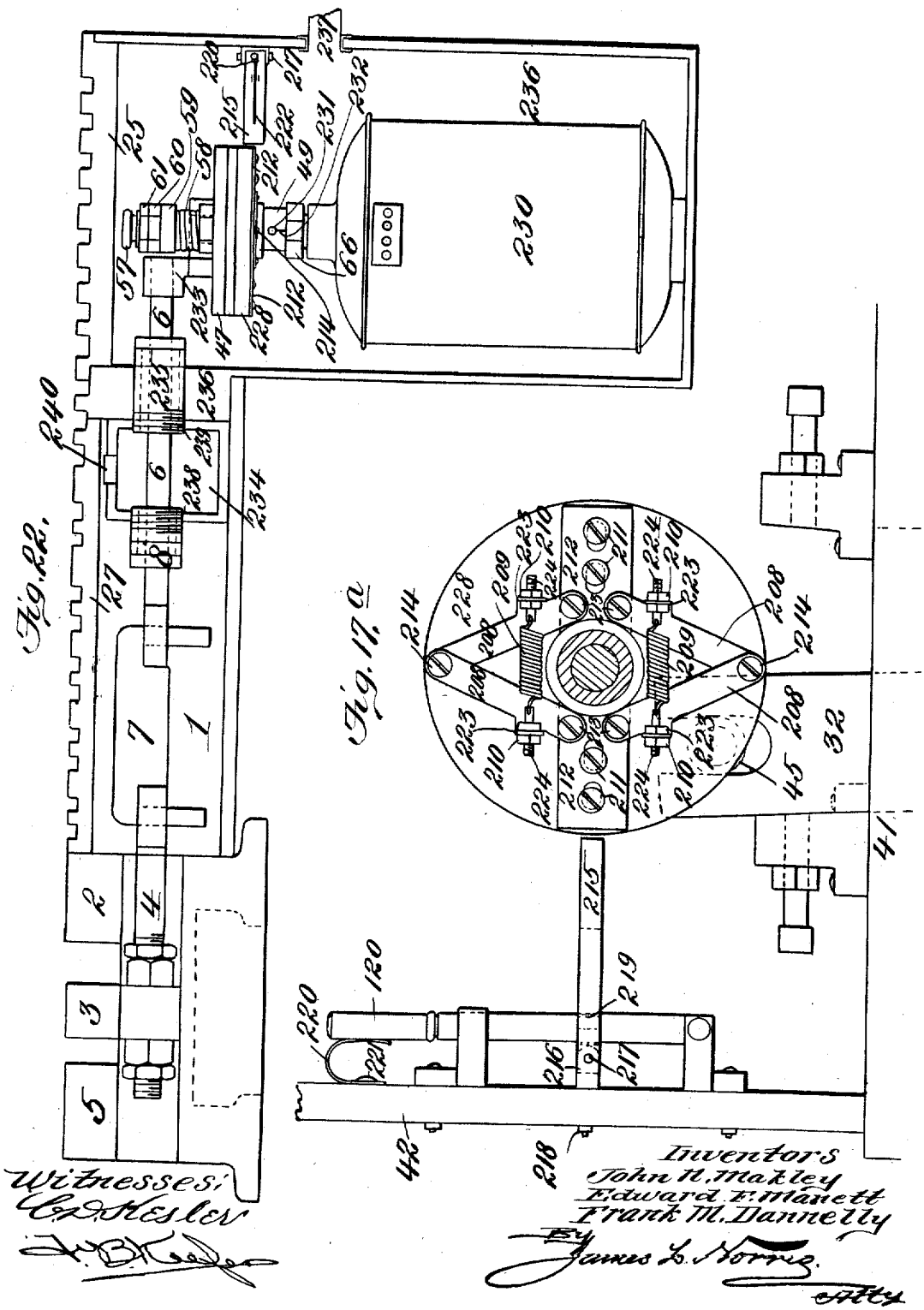

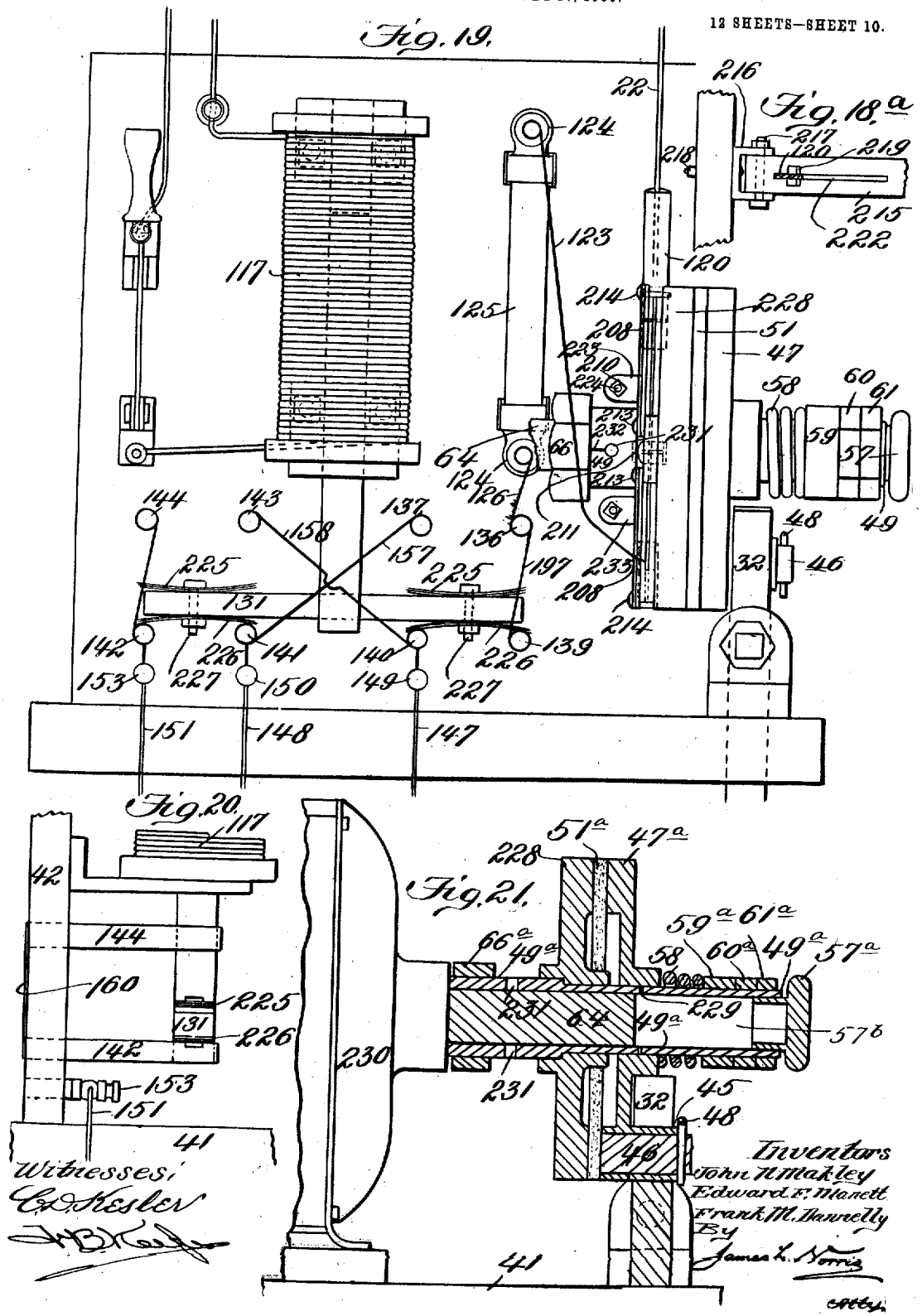

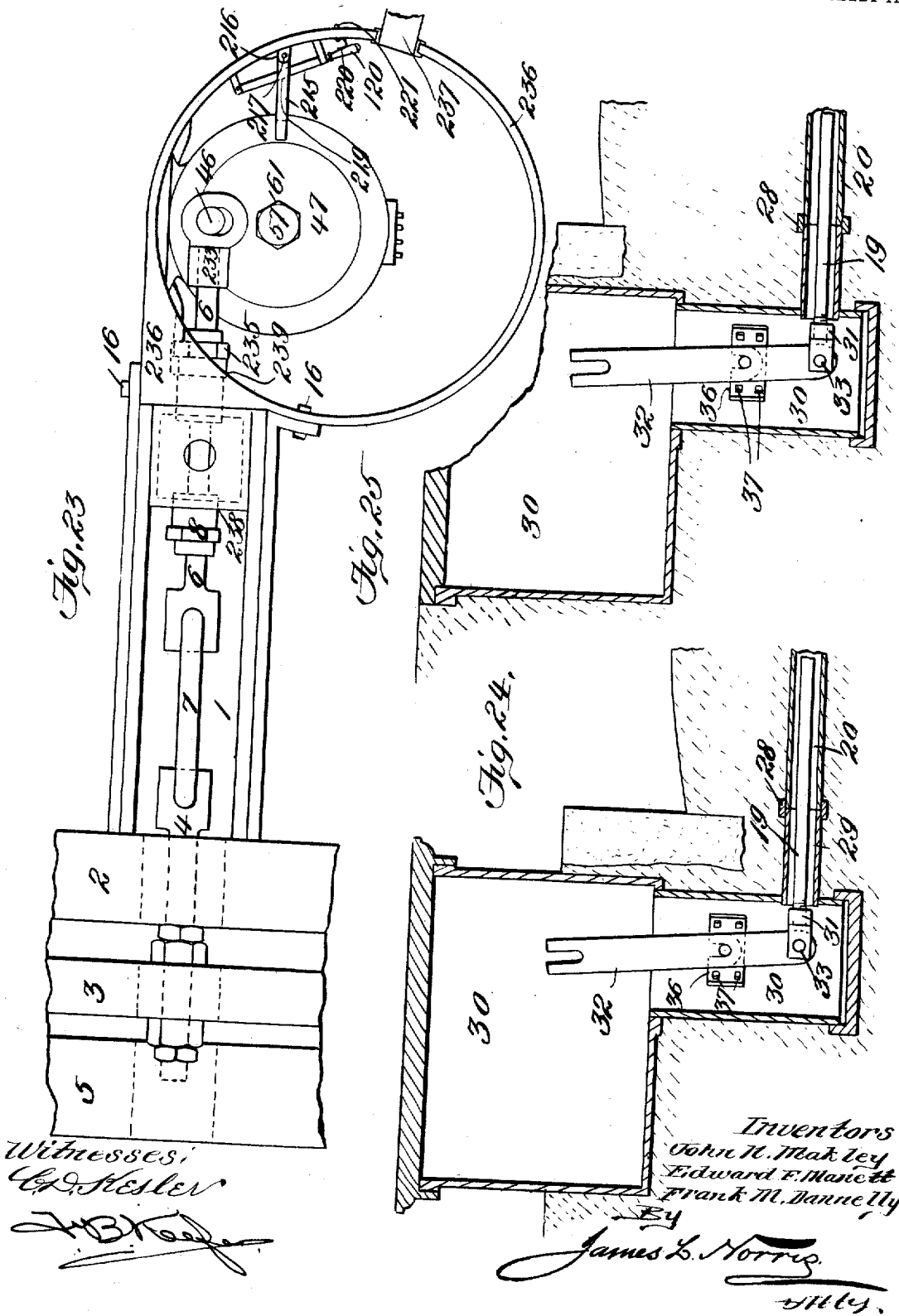

No. 843,473. PATENTED FEB. 5, 1907.
J. N. MAKLEY, E. F. MANETT & F. M. DANNELLY.
SWITCHING DEVICE.
APPLICATION FILED JULY 17, 1906.

12 SHEETS—SHEET 12.

Witnesses:
C. D. Kesler

Inventors
John N. Makley
Edward F. Manett
Frank M. Dannelly
By James L. Norris
Attys.

UNITED STATES PATENT OFFICE.

JOHN N. MAKLEY, EDWARD F. MANETT, AND FRANK M. DANNELLY, OF DALLAS, TEXAS, ASSIGNORS TO STANDARD ELECTRIC COMPANY, OF DALLAS, TEXAS, A CORPORATION OF DELAWARE.

SWITCHING DEVICE.

No. 843,473.　　　Specification of Letters Patent.　　　Patented Feb. 5, 1907.

Application filed July 17, 1906. Serial No. 326,600.

*To all whom it may concern:*

Be it known that we, JOHN N. MAKLEY, EDWARD F. MANETT, and FRANK M. DANNELLY, citizens of the United States, residing at Dallas, in the county of Dallas and State of Texas, have invented new and useful Improvements in Switching Devices, of which the following is a specification.

This invention relates to an electrically-operated switch-tongue-throwing mechanism; and the object thereof is to provide a mechanism of such class in a manner as hereinafter set forth, which is particularly adapted for throwing the switch-tongue to enable the switching of cars from one track to another.

A further object of the invention is to provide an electrically-operated switch-tongue-throwing mechanism in a manner as hereinafter set forth, whereby the motorman in the car can by using his controller, with which he operates the car, and without any additional wiring or equipage of the car by the electric controlling means, throw into operation the electrically-operated switch-tongue-throwing mechanism, so that the switch-tongue will be shifted to the proper position, such shifting of the switch-tongue being had when the power is on or shut off from the car.
A further object of the invention is to provide an electrically-operated switch-tongue-throwing mechanism which shall be comparatively simple in its construction, strong, durable, efficient in its use, readily set up with respect to the switch-tongue of a railway-track and comparatively inexpensive to manufacture.

With the foregoing and other objects in view the invention consists of the novel construction, combination, and arrangement of parts hereinafter more specifically described, and illustrated in the accompanying drawings, wherein is shown the preferred embodiment of the invention; but it is to be understood that changes, variations, and modifications can be resorted to which come within the scope of the claims hereunto appended.

Figure 17:
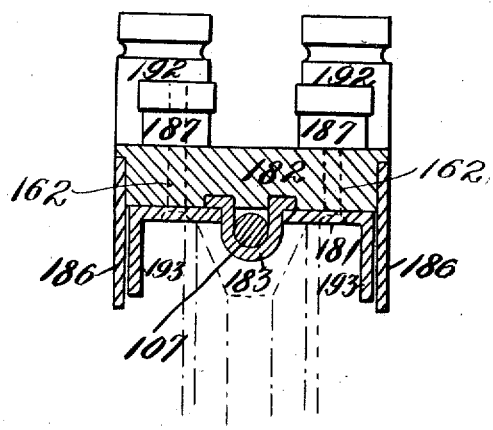
Figure 18:
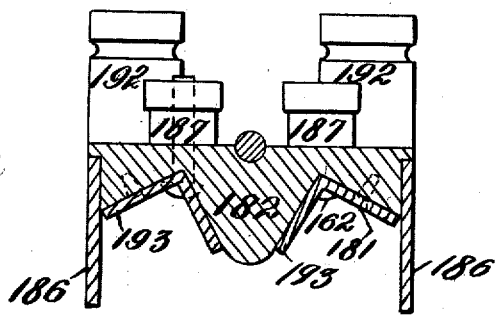
Figure 26:
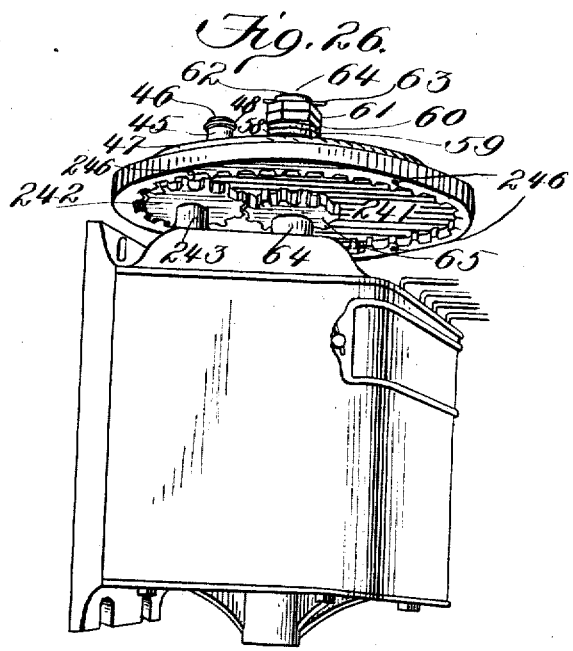
Figure 27:
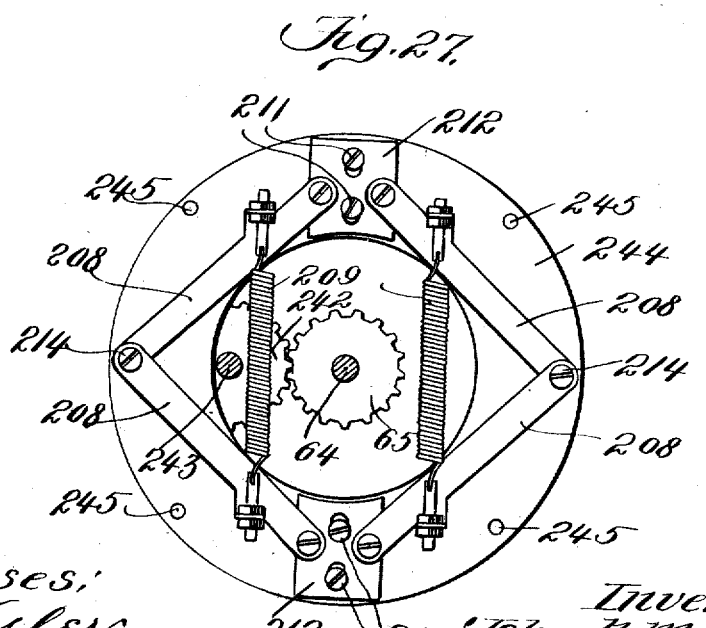

In the drawings, Figure 1 is a vertical sectional view of the switch-throwing levers, taken transversely of the track. Fig. 2 is a sectional plan view of the same, taken on line *z z* of Fig. 1. Fig. 3 is a view in sectional elevation of the gear-switch-throwing mechanism. Fig. 4 is an elevation of the circuit-changing and sectional elevation of gear-switch-throwing mechanism. Figs. 5, 6, and 7 are views in elevation and plan of the circuit-making device, the side weather-protectors removed in Figs. 5 and 6. Fig. 8 is a modified form of the lever connection. Fig. 9 is a modified form of a yieldable contact. Fig. 9$^A$ is an end view showing the arrangement of the modified form of yieldable contact illustrated in Fig. 9. Fig. 10 is a modified form of switch-throwing mechanism, having a circuit-breaker combined with the circuit-changer. Fig. 10$^A$ is a front view of the upper portion of the circuit-breaker illustrated in Fig. 10, showing in dotted lines the position of certain of the elements when shifted. Fig. 10$^B$ is a sectional view of the circuit-breaker. Fig. 11 is a sectional view taken upon the line 11 11 of Fig. 10. Fig. 12 is a view of a slightly-modified form of the circuit-changer. Fig. 13 is a sectional view taken upon the line 13 13 of Fig. 7. Figs. 14, 15, 16, and 17, and 18 are sectional views of the contact-making device, showing slight modifications in their constructions. Fig. 17$^a$ is an end view of an automatic governor with its relation to the switch or circuit-changer. Fig. 18$^a$ is a plan view of the switch. Fig. 19 is a modification of the circuit-changer and contact-points and elevation of the frictional wheel and governor. Fig. 20 is a fragmentary end view of the circuit-changer. Fig. 21 is a view, partly in section, of the direct-connected clutch mechanism, with the automatic governor removed. Fig. 22 is a vertical sectional view of a modified construction, showing the power applied direct from the motor to the switch-tongue without the use of lever-rods. Fig. 23 is a plan view thereof. Fig. 24 is a vertical sectional view of a step-block. Fig. 25 is a vertical sectional view of a well for receiving the motor and connection. Fig. 26 is a side view in elevation of a motor-gear for either vertical or horizontal service with the automatic governor removed. Fig. 27 is a plan view of the automatic governor adapted for use with the gear-wheel shown in Fig. 26.

Referring to the drawings by reference characters, 1 denotes a coupling-box having a removable lid 27, and the box 1 is positioned against one side of the guard-rail 2. The switch-tongue, which is pivoted, is indicated by the reference character 3 and is arranged at the opposite side of the guard-rail 2, and the function thereof is to cause the switching of the car from the main line to the branch line, or vice versa, and one of the track-rail sections of the branch line is designated by the reference character 5. Attached to the switch-tongue 3 is a shifting-bar 4 therefor and which extends through the guard-rail 2, a suitable opening 4ª being provided for such purpose, and the shifting-bar 4 is attached to a connecting-rod 6 through the medium of a coupling member 7, arranged within the box 1. At one side of the box 1 is arranged a casing 14, which is formed water-tight through the medium of a removable plug 25 and an annular screw-threaded flanged closure member 26, the plug 25 being connected to the top of the casing 14 and the member 26 at the bottom of said casing. Secured in the wall of the casing 14, the latter forming one wall of the box 1, is a gland 8, through which extends the connecting-rod 6, the latter having that end which projects into the casing 14 secured in a socket formed in one end of a coupling-piece 9, secured by the holdfast device 11 to one end of a lever-arm 10. This lever-arm 10 is fulcrumed on a shaft 12, which is supported in lugs 13, attached by the holdfast devices 15 to opposing sides of the casing 14. The other end of the lever-arm 10 has secured thereto, through the medium of a holdfast device 18, a coupling member 17. This member 17 has its free end provided with a socket in which is secured one end of an actuating-rod 19, formed of two sections and which extends through a conduit, to be presently referred to.

The sections of the actuating-rod 19 have the opposing ends thereof screw-threaded, and to the screw-threaded ends is secured a turnbuckle 21 for adjustably connecting the sections of the rod 19 together. Clamping-nuts 22 are provided for retaining the turnbuckle 21 in position upon the opposing ends of the sections of the rod 19. The conduit through which the actuating-rod extends is formed by a pair of tubular members 20, a pair of tubular extensions 29, a pair of unions 28, and a tubular coupling 23. One of the extensions 29 projects from the casing 14 and is connected to one of the tubular members 20 by a union 28, and the other tubular extension 29 projects from the lower end of a hollow supporting-post 30 and abuts against the other tubular section 20, as well as being secured thereto by the other union 28. The tubular members 20 do not abut, but are connected together by the coupling 23. Between the ends of the coupling and the ends of the members 20 a suitable packing 24 is interposed, so as to make the conduit water-tight. The ends of the tubular members 20 are spaced apart, so as not to interfere with the turnbuckle 21, and, furthermore, to allow the sections of the rod 19 to be properly adjusted before the coupling 23 is secured in position.

The hollow post 30 extends above the surface of the street and is formed of two abutting sections provided with lugs or flanges 38, secured together by the holdfast devices 39, and arranged within the post 30, as well as extending above the same, is a shifting-lever 32, which is fulcrumed on the shaft 35, supported in brackets 36, attached to the sides of the post 30 by the bolts 37. The lower end of the shifting-lever 32 has connected thereto by the holdfast devices 33 a coupling member 31, having its free end provided with a socket in which is secured the other end of the actuating-rod 19.

From the foregoing construction and arrangement of parts it will be evident that when the lever 32 is shifted in one direction the rod 19 will be actuated, thereby rocking the lever-arm 10, which carries the bar 4 therewith, and thereby shifts the switch-tongue 3. If the lever 32 be moved in an opposite direction, the rod 19, the lever-arm 10, and bar 4 will be moved in a direction opposite to that in which they were first moved, and consequently the switch-tongue will be shifted, but in a direction opposite to which it was first shifted.

The post 30 at its top is provided with a flange 40, and suitably secured to the flange 40 is a platform 41, formed of suitable insulating material, and hinged, as at 43, upon the platform 41 is a circuit-changer 42. The platform 41 also supports an electric motor.

The actuating-lever 32 extends through a slot 44 in the platform 41 and has the upper end thereof bifurcated, so as to enable the said bifurcated end of the lever 32 to engage a cam-roller 45, carried by a pin 46, attached to a cup-shaped member 47, forming one element of a friction-clutch, the roller 45 being retained in the bifurcated end of the lever 32 by a pin 48; but the position of the pin 48 with respect to the length of the bifurcation in the lever 32 is such that there will be no interference with the actuation of the lever 32 by the roller 45 during the rotation of the member 47.

The member 47 is mounted on a bushing 49, which is secured to a gear-wheel 50 in such a manner that when the said wheel 50 rotates motion will also be imparted to the bushing 49. Mounted upon the hub of the wheel 50 and interposed between the member 47 and the gear-wheel 50 is a fiber disk 51, which constitutes the other element of the friction-clutch and which is adapted to be held in frictional engagement by the member 47 with the gear-wheel 50. The member 47 and disk 51 are freely movable on the bushing 49, and the said member 47 is constructed with a chamber 68ª for receiving a lubricant, so that the parts will be lubricated. Extending through the bushing 49, as well as through a support 52, is a shaft 53, which is shouldered, so as to abut against one side of the support 52, and the said shaft 53 upon the end which projects from the opposite side of the support 52 carries a clamping-nut 54. The bushing 49 is secured to the gear-wheel 50, so as to rotate therewith by providing said bushing at one end with a shoulder which extends into a countersink formed in the gear-wheel 50, and the said shoulder of the bushing 49 surrounds that portion of the shaft 53 which is in proximity to the support 52. The shaft 53 is formed with an oil-passage 55, which opens at one end into grooves 56, formed upon the periphery of the shaft 53, so that the inner face of the bushing 49 and the periphery of the shaft 53 will be lubricated, and the passage 55 communicates with a lubricant-supply receptacle 57, which is secured to the shaft 53.

The member 47 is formed with a boss, and against the latter and surrounding the bushing 49 is a compression-spring 58, which also abuts against an annular washer 59, retained in position by an adjusting-nut 60, the latter permitting the tension of the spring 58 to be increased or decreased, so that the frictional contact between the disk 51 and gear-wheel will be increased or diminished as occasion requires. The nut 60 is secured in its adjusted position through the medium of a lock-nut 61. The shaft 53 projects beyond one end of the bushing 49 and carries a bearing for the bushing, the bearing consisting of a washer 62, retained in position by a pin 63, which extends through the shaft 53 and the washer 62. The washer 62 not only acts as a bearing for one end of the bushing, but also constitutes a means for preventing lateral displacement of the bushing if the shouldered portion thereof should become dislodged, which is very unlikely. The support 52 is secured to the platform 41, and the latter is provided with a pair of apertured lugs arranged in close proximity to the opening 44, and through the lugs extend set-screws 67, which are adapted to limit the movement of the actuating-lever 32, or, in other words, the set-screws 67 constitute a means for regulating the movement of the lever 32.

The shaft of the motor is designated by the reference character 64 and has a pinion 65 secured thereon by a clamping-nut 66, and the said pinion 65 engages the gear-wheel 50, so that when motion is imparted to the wheel 50 the friction-clutch will be carried thereby and rotated in the same direction as that in which the gear-wheel 50 is rotated, and therefore the lever 32 will be actuated, through the medium of the roller 45, which is carried by the member 47 of the clutch. If the direction in which the shaft 64 rotates is reversed, it is therefore evident that the gear-wheel 50 will have a reverse movement imparted thereto. So, consequently, the movement of the lever 32 will be reversed.

The spring 58 can be so adjusted as to obtain a holding contact between the friction clutch and wheel 50 to produce the actuation of the lever 32 against any pull upon the lower end of said lever by the rod 19, lever-arm 10, switch-tongue 3, and the connections between the switch-tongue 3 and lever-arm 10. Furthermore, owing to the arrangement of parts, it will be evident that after the switch-tongue 3 has been shifted to the desired position the motor-shaft through the medium of the pinion 65 can cause the revolving of the wheel 50, irrespective of the friction-clutch, without causing any unnecessary strain on the lever 32, rod 19, and lever 10.

In many instances it is necessary to place the platform on the top of the post 30 at such a height above the sidewalk so as to make it impractical to use what may be termed a "side-motion actuating-lever," and if such be the case it will be necessary to use a modified form of shifting or throwing gear, by way of example the construction shown in Figs. 10 and 11, such construction enabling the switch-tongue to be shifted through the medium of a reciprocatory element attached to the actuating-rod 19 in lieu of the oscillatory lever 32, as shown in Fig. 1. When the shifting or throwing gear (shown in Figs. 10 and 11) is substituted for the structure shown in Fig. 4, it occupies the same relative position upon the platform 41. The shifting or throwing gear, as shown in Figs. 10 and 11, is attached to the motor-shaft 64 in the same manner as the shifting or throwing gear shown in Fig. 4, or any other suitable means for transmitting motion from the motor-shaft 64 to the said shifting or throwing gear may be employed. It will, furthermore, be stated that the electrical connections, as will be hereinafter referred to, are the same whether employed with either form of shifting or throwing gear, and, when wired to the circuit-breaker mounted upon the posts 71, the operation of the reciprocatory element is obtained from the following construction, arrangement, and operation of parts:

The reciprocatory element consists of a vertically-movable elongated rod 68, which extends from the upper end of the post 30 and through the slot 44 in the platform 41, as well as up through the horizontally-extending and apertured member 81 of an L-shaped lifting-shoe 79, secured by the holdfast device 80 to the arm 78 of a bell-crank lever. The other arm of the bell-crank just referred to is formed of two sections, which are indicated by the reference character 75, and a depending portion from the arm 78, the sections 75 and the depending portion being secured together by the holdfast devices 98. The bell-crank lever is actuated so as to reciprocate the lifting-shoe 79, thereby imparting a like movement to the rod 68 through the medium of a shaft 69, provided with a worm-gear which is adapted to impart movement to an internally-screw-threaded sleeve 70, having a depending portion 80ª formed with a socket, in which is secured a guide-arm 103, which travels in a reciprocating manner in a grooved track 105, secured to the frame 73, the latter being secured to the platform 41. The shaft 69 is journaled in the uprights 71, formed on the frame 73, and projects from one of the said uprights and is suitably connected by transmission or otherwise to the motor-shaft 64. The sleeve 70 when in its normal position (which is when the rod 68 is at its limit of movement in either direction) is positioned upon one end of the shaft 69—that is, upon the unthreaded portion of the shaft. Such position of the sleeve 70 enables the rotation of the shaft 69 without imparting movement to the said sleeve. So, consequently, no strain is had upon the motor when operating in one direction; but if the motion of the motor is reversed the sleeve 70 is caused, through the medium of spring 74, one arranged near each end of the shaft 69 and in the path of the sleeve 70, to press tightly against the worm-gear on the shaft 69. Such action of the spring 74 will cause the engaging of the worm-gear with the threads of the sleeve. Consequently the sleeve will be caused to move in the opposite direction until it reaches the other unthreaded portion of the worm-shaft 69. When the sleeve 70 assumes such position, the motor-shaft will be permitted to turn freely without transmitting motion to the sleeve 70; but if the operation of the motor is reversed one of the springs 74 will again come into play and move the sleeve against the threads of the shaft. Projecting from each side of the sleeve 70 is a shifting-lug 104, and during the movement of the sleeve 70 the said lugs 104 are adapted to engage the lower end of the sections 75 of the bell-crank lever, thereby rocking the said bell-crank on its pivot 97 and lifting or lowering the arm 78 of the bell-crank, which in turn will elevate or lower the lifting-shoe 79. One arm of the lever, as before stated, is formed of a plurality of sections, two of which sections 75 straddle the sleeve 70 and are positioned in the path of the lugs 104. The lower ends of the sections 75 of the arm of the bell-crank, which are positioned in the path of the lugs 104, are beveled, so that the lugs 104 will move around the said lower ends and cause them to be positioned on the opposite side of the lugs 104, so that when the sleeve 70 moves in an opposite direction the bell-crank will be shifted, causing it to assume its normal position.

The two positions of the bell-crank are shown in dotted and full lines in Fig. 10. Projecting from the bell-crank is an arm 94, carrying a counterbalance-weight 93, adjustably secured upon the arm 94 by the holdfast device 95. Projecting from the standard 96 is a lug 92, to which is connected one end of a tension-spring 76, while the other end of said spring is attached to the adjustable counterbalance-weight 93, so that the tension of the spring 76 can be increased or diminished. From such an arrangement it is evident that the shifting of the bell-crank in one direction by the sleeve 70 is had against the action of the counterbalance-weight and the pull of the spring 76. The upright 96 not only supports the lug 92, but also the pivot 97 for the bell-crank, and furthermore has pivotally connected thereto, as at 101, an arm 99, which is secured by the holdfast device 100 to the lifting-shoe 79, said arm 99 adapted to hold the lower end of the lifting-shoe 79 in position. Secured to the rod 68 is a double-flanged collar 83, which is surrounded by the horizontally-extending apertured arm 81 of the lifting-shoe 79, and to the rod 68 at its top is also secured an abutment 82 in the form of a nut, and below the collar 83 and to the rod 68 is secured another abutment 82 in the form of a nut. The abutments 82 are retained in position by the lock-nuts 85. Between each of the abutments and the flanged collar 83 and surrounding the rod 68 are the coiled compression-springs 84, the function thereof being to furnish resistance sufficiently great to move the switch-tongue 3 during the reciprocating of the rod 68. A further function of the springs 84 is to permit a cushioning resistance to the lifting-shoe 79 in event of the switch-tongue 3 becoming immovable. Consequently it will be evident that the travel of the sleeve 70 upon the shaft 69 will be had without causing any serious strain on the arms 75 and 78 of the bell-crank or upon the motor, the tension of the spring 76 being such as to overcome the pressure of either the springs 84 after the sections 75 of the bell-crank has passed to the opposite side of the shifting lugs 104, so as to hold the lower end of the sections 75 in such position as to be engaged by the lugs 104 when the sleeve 70 is caused to travel in the opposite direction. The connection between the rod 68 and the actuating-rod 19 is had through the medium of a bell-crank lever 87, which is pivoted in the lower end of the support 30, as at 89, one arm of the bell-crank carrying a socket member 86, in which the lower end of the rod 68 is secured, and the other arm of the bell-crank 87 carrying a socket member 31, in which one end of the rod 19 is secured. The socket-piece 31 is secured to the bell-crank by the holdfast device 33 and the socket member 86 by the holdfast device 88.

The motor is operated by causing the trolley-wheel of a car transferring from the main conductor or trolley-wire upon a circuit-forming means comprising a contact-making device and a circuit-changer. The contact-making device is shown, by way of example, in Figs. 5, 6, 7, 13, 14 and consists of a strip of insulating material 106, through which suitably extends the main conductor or trolley-wire 107, and at each end of the strip 106 metallic saddles 108 are secured and arranged for supporting the main conductor 107. On one side of the strip 106 is attached a metallic bar 109 by means of a dovetail groove, the said bar 109 extending substantially the entire length of the strip 106, but is disconnected from the saddles 108 by short strips of insulating material. On the other side of the strip 106 is a metallic bar 110, secured by a dovetail joint; but the bar 110 is not as long as the bar 109, and the ends of the bar 110 are separated from the saddles 108 by the elongated bars of insulating material 111 of the same size and shape in cross-section as the said bar 110, and the said insulating-bars 111 are secured to the strip 106 in any suitable manner. Secured to the bar 109, intermediate the ends thereof, is an angle-shaped metallic member 112, and a like-shaped metallic member 113 is attached to the bar 110. In Fig. 13 the position of a trolley-wheel with respect to said circuit-forming means is shown in dotted lines, and in connection therewith it will be stated that the trolley-wheel carries the current from the bar 109 to bar 110, and owing to the interposition of the bars 111, of insulated material, the flow of current is interrupted between the bar 110 and the saddles 108.

The current is switched through the medium of a circuit-changer carried by the platform 41 and which consists of a circuit-wire 114, which is attached to the main conductor or trolley-wire 107 or, if more convenient, to the feed-wire (not shown) and to the switch 115. A circuit-wire connection 116 is had between the switch 115 and the magnet 117, and a circuit-wire connection 118 is had between the magnet 117 and the bar 109 through the medium of attaching the wire terminal 118 by the binding-post 162 to the metallic angular-shaped member 112. By such an arrangement the current is passed from the main conductor 107 or from the feed-wire to the magnet 117 and thence to the bar 109, through the trolley to the bar 110. A circuit-wire connection 119 is secured to the metallic angular-shaped member 113 by the binding-post 162, the member 113, as before stated, being secured to the bar 110. The wire 119 leads to a post 121, the latter being connected with a switch 120 by the wire connection 122. A conductor 123 extends from the switch 120 to a fuse-block 124, provided with a five-hundred-volt two-ampere non-arc fuse 125, which is employed to prevent short-circuiting of the main conductor or trolley-wire 107 in case of accidental interruption of the current between the fuse-block 124 and the operating electric motor or the grounding of the current, and the conductor 126 connects the fuse-block 124 with a contact-plate 127, and from the latter a wire 128 leads to a contact-plate 129. The current is conveyed from plate 129 to contact-piece 130 on the arm 131, which is carried and shifted by the core 132 of the magnet 117. The arm 131 is formed of insulating material and carries not only the contact-piece 130, but also the pieces 133 134, said contact-pieces being formed of non-insulating material and suitably spaced apart from each other, so there will be no electrical connection therebetween. The pieces 130, 133, and 134 are adapted to make contact with the elastic brushes carried by the contact-plates 127, 135, 136, 137, 129, 138; 139, 140, 141, 142, 143, and 144, and the contact-pieces 130, 133, and 134 are normally in contact with the elastic brushes 145 of the plates 129, 138, 139, 140, 141, and 142. The brushes 145 are made somewhat elastic, so that an accurate and positive contact will be had between the brushes 145 and the pieces 130, 133, and 134. From the contact-piece 130 the current is conveyed to contact-plate 138, thence to post 146, and from there leads by conductor 147 to field-post of motor, thence from field-post over conductor 148 to post 149, thence to plate 139, through contact-point 133 and plate 140, thence to post 150, over conductor 151, which leads to motor-armature, over wire 152 to post 153, to contact-plate 141, to contact-piece 134, to contact-plate 142, over conductor 154 to post 155, thence over conductor 156 to ground. In Fig. 4 the travel of the current in one direction is indicated by plain arrows, the circuit thus formed operating the motor in the direction to throw the levers in position for shifting switch-tongue 3 to cause the car to take the main track. The arrows with tail in Fig. 4 show the travel of the circuit when the operation of the motor is reversed, so as to cause the shifting of the levers in a direction to throw the switch-tongue 3 to cause the car to take the curved or branch track. The heavy lines for indicating the wires or conductors are intended to designate the wiring placed on the back of the circuit-changer, and they form a connection through the slate slab of the circuit-changer with screw attachments which hold the different parts they connect in position. Those wires which connect plate 138 with plate 136 and plate 139 with plate 135 are crossed, the wire between plate 138 and 136 being bridged at its center and properly insulated. The wires shown in Fig. 4, and which are represented by two lines, are connected on the front of the slate slab of the circuit-changer and extend to the different points hereinbefore set forth.

In operation if the motorman desires to continue on the main line he must turn his controller to cut off the main current of electricity from the car-motor while the trolley-wheel is passing the contact-making device of the circuit-forming means with which the trolley-wheel contacts. The car, owing to its momentum, will traverse the said contact-making device. While the trolley-wheel is traversing said contact-making device, owing to the momentum of the car the current is traveling from the main conductor or trolley-wire 107 over circuit-forming wire 114, through switch 115 and over wire 116, then through magnet 117 over terminal wire 118 to the bar 109. It is there transferred by the trolley-wheel to the bar 110, thence over circuit-wire connections 119 and 122 to the switch 120, thence over the conductor 123 to the fuse-block 124, from this block 124 and fuse 125 to wire 126, to contact-plate 127, thence over wire 128 to contact-plate 129, thence to contact-piece 130, over same to plate 138, thence over conductor 147 to field-post of motor, the current continuing through the motor from field-post over conductor 148 to contact-plate 139, thence to contact-piece 133, through same to plate 140, through post 150, over conductor 151 to armature-motor, from armature-motor over wire 152, through post 153 to contact-plate 141, thence to contact-piece 134, over the same to contact-plate 142, over conductor 154 to post 155, to conductor 156, thence to ground. This will operate the motor in the direction required to shift the gear, so that the mechanism actuated thereby will move the switch-tongue 3 to the necessary position, so as to cause the travel of the car on the main track. During its operation the contact-pieces 130, 133, and 134, carried by the arm 131, will remain in contact with the brushes 145, which extend from the plates 129, 138, 139, 140, 141, and 142, notwithstanding the fact that the current is flowing through magnet 117. The reason for this is that the motor does not draw sufficient current to energize the magnet 117. Hence the device stands in this position. As soon as the trolley-wheel has passed the contact-making device the motorman turns on his controller to start the current, so as to cause the traveling of the car.

If the motorman desires to direct his car to the branch line, he simply leaves his controller in position with the current in communication with the car-motor. In performing this operation the magnet 117 is grounded through the motor on the car, and therefore the motor draws sufficient current to energize the magnet 117, which draws the core 132 within the magnet, thereby causing the shifting of the arm 131 and the contact-pieces 130, 133, and 134 to engage the brushes 145 of the plates 127, 135, 136, 137, 143, and 144. When the parts are in this position, the current is led through wire 114, switch 115, wire 116, magnet 117, through the latter over wire 118 to bar 109, thus taking the place of the main conductor or trolley-wire 107. From the bar 109 the current is transferred from the trolley-wheel to the bar 110. From the bar 110 the current is led over wire terminal 119 to post 121, over wire connection 122 through switch 120, thence over wire connection 123 to fuse-block 124 to fuse 125, thence over conductor 126 to contact-plate 127, thence over brush 145 to contact-piece 130, through same to brush 145, carried by plate 135, thence over wire 157 to contact-plate 139, through post 149, thence over conductor 148 to field of motor, from motor over conductor 147 to post 146 to contact-plate 138, thence over wire 158 to contact-plate 136, thence through the brush 145 of said plate 136 to contact-piece 133, through same to brush 145 of plate 137, thence over wire 159 to plate 140, through post 150, over conductor 151 to armature-motor, from armature over conductor 152 to post 153, to plate 141, thence over wire 160 to plate 143, through brush 145 of plate 143 to contact-piece 134, thence over contact-piece 134 to brush 145 of plate 144, thence over wire 161 to post 155, thence over conductor 156 to ground. The motor will thus be reversed and moved in the opposite direction from which it is run in when the contact-making device was passed with the current off. Owing to the reverse movement of the motor, the levers are so actuated as to shift the mechanism to throw the switch-tongue 3 in the proper direction, so as to cause the car to take the branch line.

The object obtained by constructing the bar 110 shorter than the bar 109 is to enable the energizing of the magnet 117 before the motor is operated when the controller of the car is on and also when the trolley-wheel is passing off the circuit-forming means, which will discontinue the operation of the motor before the magnet 117 is deënergized. If such an arrangement was not provided, there would be created at the start and end of the operation of throwing the switch-tongue the burning of the contact-plates engaged by the contact-pieces on the arm 131, as well as said pieces and the elastic brushes 145.

In Fig. 10 is shown a circuit-breaker, the purpose thereof being to shut off the current should a car stop with its trolley-wheel in contact with the circuit-forming means engaged by the wheel. The circuit-breaker is adapted to discontinue the operation of the motor, and, furthermore, discontinue the operation of the motor if from any cause the terminal wires 118 119 should contact with each other. It will be stated, however, that it will be optional as to whether the circuit-breaker is employed or not. The circuit-breaker is secured to one side of the post 71 and consists of a plate of insulating material 163 with the upper and lower marginal portions thereof offset, as at 164, to form a groove 165, in which operate the breaker members 166, carried by the tubular brackets 200, secured to the arms 199, forming a part of a metallic strip, positioned in the groove 165 and connected to a strip of insulated material 198, also positioned in the groove 165. Each of the breaker members 166 terminates in a breaker-point 168, these points extending in opposite directions with respect to each other. The breaker members 166 are caused to reciprocate through the medium of the guide-arm 103, attached to the sleeve 70, the arm 103 moving against the arms of a yoke 167, secured to the strip 198. When the members 167 are reciprocated, the breaker-points 168 are carried thereby. Provision for the moving of the yoke 167 is made by providing the plate 163 with a slot 175, through which the yoke 167 extends. At each end of the plate 163 a post is secured. These posts are indicated by the reference characters 170, and in each of the posts is inserted tubular contacts 171 with elastic ends for the purpose of holding the breaker-points 168 in contact therewith until the sleeve 70 has passed near the point of the limit of its movement in one direction. Mounted upon each of the members 166 is a coiled compression-spring 172, and the function of said springs 172 is to instantly pull the breaker-points 168 sufficiently far from the tubular contacts 171 to prevent arcing of the current, thereby breaking the contact and instantly stopping the motor when the sleeve 70 has traveled its required distance. The same operation is repeated when the sleeve 70 moves in the opposite direction.

The circuit-breaker is fed by the wire 147, attached to a metallic plate 173 by the holdfast device 169, and the said plate 173 is adapted to contact with a metallic strip provided by the arms 199, which supply the current from the arms 199 of said strip to the brackets 200, thence to the breaker-points 168. The current is supplied to the contacts 171 through wires 176 and 177, attached to screws 174. The wiring in detail of the circuit-breaker is as follows: When wiring, the circuit-breaker plates 127 and 129 and the wire connection 128 of the circuit-forming means are omitted. The conductor 147 to the field of the motor has its ends attached to the screw 169 of a metallic plate 173, making contact with the members 166 instead of being connected to the post 146. The wire 176 is connected to the post 146, leading to plate 138, then secured by screws 174 to the post 170, supporting the left-hand tubular contact 171. The conductor 148 leads from post 149 to the opposite field of motor, and conductor 151 leads from the post 150 to armature of the motor, while conductor 152 leads from armature of motor to post 153, thence to plate 141, and from plate 141 over conductor-wire to plate 143. A wire connection 177 leads from plate 137 to screw 174 and post 178, which supports the right-hand tubular contact 171, setting the contact in position to operate the motor when the car passes the circuit-forming means with the power on, at which time the current follows the course of the arrows with tails and moves the sleeve 70 to the left.

The shoes 108 (shown in Figs. 5, 6, 7, and 16) are so positioned that they extend below the line of the insulating-bar 106 at a point marked X, which forms a break to prevent water from following the conductor or trolley-wire 107 onto the shoe 108 and from thence to the strip 106, thereby producing moisture between the bar 109 and bar 110, as the water will not pass beyond the point marked X on shoe 108, but will drop to the ground. The top portion of each of the shoes 108 is gradually broadened toward the end attached to the strip 106, so that the trolley-wheel when following the same is gradually deflected by its side bearings so as to make it run onto the metallic strip connection smoothly without interruption.

Figure 16:
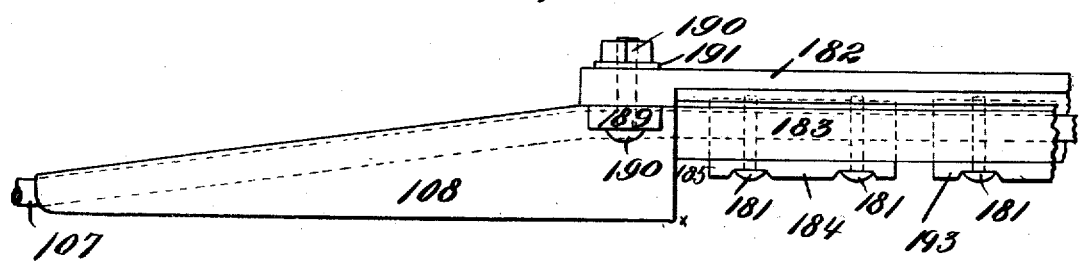

In a modified form of contact-making device, as illustrated in Figs. 15 and 16, the metallic bars 109 and 110 are dispensed with and angle-irons 193 employed instead. These angle-irons are secured by holdfast devices in position against the beveled edges of a roof 182, formed of insulating material. Main conductor or trolley-wire 107 extends through a trough 183, formed of insulating material, the said trough 183 extending in a groove in the lower face of the roof 182, and is held in position by the edges of the angle-irons 193 engaging the beveled shoulders projecting laterally from the trough 183. Holdfast devices 162 and 181 extend through the angle-irons 193 and roof 182, and which also act as a means for connecting the wires 118 119 to the angle-irons 193. The angle-iron 193 at one side of the trough 183 is analogous to the strip 110, and the interruption of the current at each end of the angle-irons 193 is produced by intervening spaces formed by short lengths of angle-irons 184, these latter forming filling-blocks to permit the trolley-wheel to run evenly and uninterruptedly across the full length of the contacting device, these spaces being indicated by the reference character 185. These latter are intended solely for the purpose of breaking the current from the brass shoe 108 to the long angle-irons on either side. On the long side it is only absolutely necessary to have one space 185; but two spaces are shown, so as to make it absolutely certain that the current will not arc from the brass shoe to the long strip. On the opposite or short side it is necessary to have enough spaces to reduce the length of the angle-iron, so that the trolley wheel will energize the magnet before it strikes the short iron and operates the motor. At each end of the elongated angle-iron 193 the current from the shoe 108 is interrupted by a sufficient number of spaces 185. The elongated angle-iron is analogous to the bar 109. Protectors 186 are provided for the contact-making device, as shown in Figs. 15 and 16.

In Fig. 17 another modified form of contact-making device is shown, and in this connection it will be stated that in lieu of mounting the angle-irons in a manner as shown in Figs. 15 and 16 they are positioned by placing them flat against the lower face of the roof 182, and the said angle-irons in Fig. 17 are adapted to hold the trough 183, which contains the main conductor or trolley-wire 107, in position by engaging the flanges on each side of the trough, which extend in grooves formed in the lower face of the roof 182. In Fig. 17 the short length of angle-irons 184 are employed so as to provide the intervening spaces. The contact between the trolley-wheel and the contact-making device shown in Figs. 15, 16, and 17 is made by the engagement of the edges of the wheel with the angle-irons. In all other particulars the two modifications referred to of contact-making device operate in the same manner as the contact-making device shown in Figs. 5 and 6.

In the modification shown in Fig. 18 the angle-irons 193 are placed in position in grooves formed on the lower face of the roof, these grooves having beveled sides, and the trolley-wheel is adapted to contact with the angle-irons 193 in the same manner as it contacts with the bars 109 and 110. The angle-irons are held in place by the hold-fast devices 181 and 162, and the trolley-wire conductor 107 is diverted upward in a straight line with the groove in the shoe 108, the same as that illustrated in Fig. 14. The wire connection is attached to the bolt 162. A cap 187, of insulating material, which has a slot in same, so that it will extend around the wire connection and tightly secures the same in position and forms a non-conductor covering for bolts 162. Each of the shoes 108 is provided with two arms 189, having openings 188, through which extend bolts 190. For securing the shoes to the roof 182 washers 191 are provided. All the wire connections above the roof 182 are provided with caps 187, of insulating material, and the strain of the wires 118 and 119 is taken off the connection by insulating-knobs 192.

The supporting-post 30 is provided with a plug 195 to permit of supplying a lubricating material to the interior of the said post, so that the mechanism below the ground will be lubricated. The lubricating material flows through the conduit and lubricates the parts in the casing 14 and box 1, and this oil also serving the purpose of keeping any water from getting into the underground casing or conduit from the opening in the track or guard-rail entering box 1, thus preventing any possibility of filling with water and freezing in cold weather.

Preferably the core 132 of the magnet 117 is square, so as to prevent the turning of the core. Such arrangement insures the arm 131 always being in line to make proper contact with the brushes 145.

In Fig. 9 a modification is shown of a contact-plate and brush, and in this connection it will be stated that the contact-plate is indicated by the reference character 144ª, is angular in contour, and has mounted thereon a shiftable plate 145ª, which is an equivalent of the brush 145. The plate 145ª is formed with a socket 204 at one end and an opening 203. In the socket 204 is secured one end of a circular spring 201, the said spring extending down through the opening 203, then through an opening 202, formed in the plate 144ª, and its other end secured in a socket 205, which is also formed in the plate 144ª. The plate 145ª is offset, as at 202ª, said offset constituting a fulcrum for the plate 145ª, and which engages in a groove 202ᵇ, formed in the plate 145ª. The plate 144ª is secured to the slate slab of the circuit-changer by the hold-fast devices 206 and 207.

Fig. 9ᴬ shows the adaptation of the modified form of contact illustrated in Fig. 9 with respect to the arm 131 and one of the contact-pieces carried thereby—for example, the contact-piece 134, the latter being adapted to engage the plate 145ª.

In Fig. 17ª is shown an automatic governor having connection with a positive wheel 228, carried on the motor-shaft 64, and also with a switch 120 on the circuit-forming means, and the said governor comprises a plurality of vibratory arms 208, connected together at their outer ends by bolts 214 and at their inner ends connected by bolts 213 to expansion-weights 212, these latter being drawn toward each other by springs 209, the ends of which are fastened to bolts 224, secured to the brackets 223 by nuts 210. The weights 212 are connected to the wheel 228 by headed retaining devices 211, which extend through elongated slots formed in the weights, and the slots permit of the shifting of the weights upon the wheel 228, with their movement limited in either direction by the retaining devices 211. When in operation, the weights 212 are adapted to project beyond the radius of the wheel 228 against the action of the springs 209, thereby enabling the arms 208 to spread by centrifugal force, which will cause the throwing of the expansion-weights a sufficient distance to strike the lever 215, causing the latter to fly either up or down, according to what direction the motor is revolving. Such action will release pin 219, which presses against the edges of slots 222 in the lever 215, and as the pin is connected to switch 120 pressure upon the pin is released and the spring 220 will then throw switch 120 open, thereby cutting off the power and arresting the operation of the motor. It will furthermore be evident that the automatic governer acts as a safety device as well as a cut-off in the event that the wires feeding the motor should become crossed or accidentally brought together. The lever 215 is connected to the slate slab of the circuit-changer mounted on platform 41 by hold-fast devices 217, connecting the said lever 215 to hinge 216, the latter being secured in position by a bolt 218. The spring 220 is interposed between the switch 120 and the slate slab of the circuit-changer and has one end secured, as at 221, to the slate slab.

In Fig. 19 is shown a modified form of circuit changing and making means, and in such connection it will be stated that the said means shown in Fig. 19 is wired in the same manner as the similar means shown in Fig. 12, with the exception that the wire 126 runs direct to post 136. An arm 197 runs direct to post 139, the contact-pieces on arm 131 being in the form of flexible metallic brushes 225 and 226, held in position on the arm 131 by hold-fast devices 227, and owing to the employment of the flexible metallic brushes it enables the use of plain metallic contact-posts 144 and 142, 141 and 143, 140 and 137, 139 and 136 instead of spring-contacts, as shown in Fig. 9, or the brushes 145, as shown in Fig. 4.

In Figs. 19, 20, and 21 is illustrated a frictional power-clutch mounted on the motor-shaft and in the said figures 49ª denotes a bushing with a tapering threaded clamp at the end next the motor and which is secured on the motor-shaft by a nut 66ª, the taper-thread being split on four sides, as at 231 and 232, so as to enable the nut 66 to tightly clamp the bushing to the motor-shaft. A positive wheel 228 is secured to the bushing 49ª by a shouldered joint to always insure its turning with the motor-shaft. The fiber disk 51ª, forming one member of the frictional clutch, revolves loosely between wheel 228 and the cup-shaped member 47ª, which forms the other element of the friction-clutch. The member 47ª is held in engagement with the disk 51ª, the latter in turn frictionally engaging the wheel 228 through the medium of a spring 58ᵇ, held by a washer 58ª and secured on the bushing 49ª by the nuts 60ª and 61ª. The bushing 49ª extends from motor-shaft 64 to a lubricant-reservoir 57ª, so as to form an oil-chamber 57ᵇ to lubricate the movable parts carried on bushing 49ª through opening 229. It will be obvious that the operation of the friction clutch shown in Figs. 19, 20, and 21 is the same as that shown in connection with Fig. 4 with the exception that the bushing is inverted and secured directly to the motor-shaft.

In Figs. 22 and 23ª mechanism is shown by which power is applied direct from the motor to the switch-tongue without the interposition of the shifting lever and actuating-rod. In this connection the motor is indicated by the reference character 230, and the frictional clutch and its operative parts are carried by the motor-shaft and which are placed in a water-tight receptacle 236, the motor being in vertical position with the frictional clutch at the top of the motor. A cam 46 is attached to the connecting-rod 6 by a slotted arm 233, and the said rod 6 extends through a stuffing-box 235, secured in the wall of the receptacle 236 and also into the casing 234 at the threaded opening 239, thereby securely drawing the casing 234 against the solid wall of the receptacle 236 before making a water-tight joint. The casing 234 has a threaded opening 238, in which is secured the stuffing-box 8. At the top of the casing 234 is a screw-plug 240. The casing 234 is filled with vaseline or other solid oil for lubricating a stuffing-box 238 and 235, through which the rod 6 passes, the oil also lubricating the rod 6 and as a special safety to prevent water from getting through box 1 into the motor, the box 1 being also filled with heavy oil to prevent same from filling with water and to lubricate the mechanism therein. In operation the motor revolving to the right draws the rod 6 inward, pulling the coupling member 7 and rod 4 therewith, which in turn will move the switch-tongue toward the track 2. In reverse operation of the motor the rod 6 is pushed toward the track 5, thereby moving the switch-tongue 3 in a like direction. The location of the receptacle containing the motor and its connections is in the middle of the track opposite the switch-point. In this instance the circuit-changer can be placed on a post at any convenient place on the sidewalk, and the circuit-forming connections from and to the same are had in a manner as hereinbefore set forth, or, if preferable, the circuit-changer can be placed in the receptacle 236, which contains the motor, the wires being connected to the motor and circuit-changer through conduit 237. In the event the circuit-changer is mounted on the post an extra switch is attached to the wall of the receptacle 236, the lever 215 extending forward to friction-wheel to be operated by a governor on the same, the wire connections being extended through the switch to the motor the same as through switch 120 of the circuit-changer.

In Fig. 24 is shown a step-block for receiving the motor, so that the same may be connected to lever 32 in the same manner as shown in Figs. 3 and 19 and when it is found undesirable to mount the motor upon the supporting-post 30. In cases where the step-block is objectionable the motor can be placed in a water-tight compartment with the top set level with the sidewalk, as shown in Fig. 25, and the motor and bar connected to the lever 32 in a manner as hereinbefore shown.

In Fig. 26 the gear-wheel 241 has a friction-surface on its top to engage the fiber disk 51, upon which presses a member 47. The wheel 241 is mounted loosely on a bushing set up and operated in the same manner as when connected with a gear-wheel 50. The wheel 241 is secured to the bushing 49 in place of the wheel 50 and is used in the same manner except its application to the motor. The bushing is inverted and revolves directly upon the motor-shaft. The motor-shaft 64 extends entirely through the bushing 49 and is securely held in position by a washer 62, fastened by a pin 63. This also holds the bushing against the cog-wheel 65, which is tightly secured to the shaft 64. The cogs of the wheel 65 engage the cogs of the wheel 242, which revolves freely on shaft 243, the latter being secured to the frame of the motor. The cogs on the wheel 253 engage the teeth on the wheel 241 and which will revolve wheel 241 in either direction. The object of this form of gearing is to furnish a back gearing to increase the power of the motor and at the same time maintain as small a space as possible in mounting the back gearing direct to the motor-shaft, and thereby admit of the motor and its gearing being used in either a vertical or horizontal position without any change in the gearing.

In Fig. 27 the automatic governor is adapted to be used on wheel 241 (shown in Fig. 26) and which is mounted on a circular disk 244, having an opening of sufficient size to prevent interference with the cog-wheel shaft 243 and is secured to the wheel 241 by bolts 245, passing through openings 246. The mechanism and operation of the governor is identical as shown in Fig. 17 and as heretofore described.

It will be evident that when from any cause it is necessary to increase the power of the motor the latter may be geared or backgeared with any common or known form of gearing to serve the purpose and that the governor can be applied to such gearing in any convenient manner.

In regard to the trolley-wire or conductor it is to be understood that the same may be in the form of any conductor for electric energy, and therefore we do not desire to limit ourselves in any particular to the terms used throughout the descriptive matter, and, furthermore, in reference to the trolley-wheel, the same may be any suitable member for transferring the electrical energy for operating the electrical devices, as the said devices are applicable to a third-rail system or underground-current system when slight modifications of the connections are made.

It will furthermore be understood that the construction of the circuit-forming means engaged by the trolley-wheel, as heretofore referred to, can be so set up to make connections with a third-rail and conduit system, surface-contact or electromagnetic systems, or any other ground-current in a similar manner as applied to the trolley-wire.

Having described the invention, what is claimed is—

1. In a switch-thrower of the class described, a contact-making device interposed in the circuit of a trolley-wire, a circuit-changer having a magnet in electrical connection with said contact-making device, a movable armature having contact-points and controlled by said magnet, a plurality of contact-brushes for engagement with the contact-points of the armature, electrical connections between the contact-plates for directing the current, a motor having electrical connection with said contact-brushes, mechanism for actuating the switch and operable by the motor, and a circuit-breaker in electrical connection with said circuit-changer and controlled by said switch-operating mechanism.

2. In a switch-thrower of the class described, a contact-making device having oppositely-disposed contact-plates insulated from one another and from the current of the main circuit, a circuit-changer having a magnet electrically connected to one of the contact-plates and with the current of the main circuit, an armature having contact-points controlled by said magnet, a series of oppositely-disposed contact members in electrical connection with one another and for engagement with the contact-points of the armature, and also in electric connection with the other of said contact-plates, a reversing-motor having connection with said contact members and controlled in its movement by the current passing therethrough, and frictional-controlled mechanism coöperative with said motor and in connection with the switch for operating the same.

3. In a switch-thrower of the class described, a contact-making device interposed in the main circuit and insulated therefrom, a circuit-changer having a core-magnet provided with a movable armature, and in electrical connection with said contact-making device and the circuit of the main line, switches for said electrical connection, a series of contact-plates arranged in the circuit-changer, and in electrical connection with said contact-making device, an insulated arm carried by the armature and having contact-points for engagement with the contact-plates for changing the direction of flow of the current, a motor having electrical connection with said contact-plates, switch-coupling mechanism, and switch-throwing mechanism connected with the said coupling mechanism and with the motor.

4. In a switch-thrower of the class described, a contact-making device interposed in the main circuit and insulated therefrom, a circuit-changer having a core-magnet provided with a movable armature, and in electrical connection with said contact-making device and the circuit of the main line, switches for said electrical connection, a series of contact-plates arranged in the circuit-changer and in electrical connection with said contact-making device, an insulated arm carried by the armature and having contact-points for engagement with the contact-plates for changing the direction of flow of the current, a motor having electrical connection with said contact-plates, switch-coupling mechanism, switch-throwing mechanism connected with said coupling mechanism and with the motor, and a circuit-breaker arranged in circuit with the circuit-changer and actuated by the switch-throwing mechanism.

5. In a switch-thrower of the class described, a contact-making device interposed in the main circuit and insulated therefrom and having a roofing, oppositely-disposed contacting plates carried by said contact-making device and insulated from one another and the main circuit, a circuit-changer having a core-magnet provided with a movable armature and in electrical connection with one of the contact-plates and the main circuit, a series of contact members separated from one another, an insulated arm having contact-points carried by said armature and for engagement with the contact members, a non-arc fuse in electrical connection with said contact members and with the other of said contact-plates on the contact-making device, a reversing-motor having electrical connection with said contact members and controlled by the current fed therefrom, and mechanism coöperative with the motor for actuating the switch.

6. In a switch-thrower of the class described, a contact-making device interposed in the main circuit and insulated therefrom and having a roofing, oppositely-disposed contacting plates carried by said contact-making device and insulated from one another and the main circuit, a circuit-changer having a core-magnet provided with a movable armature and in electrical connection with one of the contact-plates and the main circuit, a series of contact members separated from one another, an insulated arm having contact-points carried by said armature and for engagement with the contact members, a non-arc fuse in electrical connection with said contact members and with the other of said contact-plates on the contact-making device, a reversing-motor having electrical connection with said contact members and controlled by the current fed therefrom, mechanism coöperative with the motor for actuating the switch, and a circuit-breaker actuated by said mechanism and in electrical connection with the circuit-changer.

7. In a switch-thrower, a contact-making device arranged in the main circuit and insulated therefrom, contact-bars supported by said contact-making device and of varying lengths, a roofing for said contact-making device, protector members for the contact-bars, a circuit-changer having connection with the said bars and with the main circuit, a plurality of contact members electrically connected for changing the course of the current of the main circuit and arranged in the circuit-changer, a motor connected with said contact members, a switch-throwing device coöperative with the motor, and adjustable coupling means connected with the switch and with the switch-throwing device.

8. In an electric switch-throwing mechanism, a contact-making device interposed in the main circuit, a circuit-changer having a squared core-magnet electrically connected with the contact-making device and the main circuit, a squared armature movable in the core-magnet and having an insulated arm provided with contact-points, a plurality of contact-brushes electrically connected to one another and adapted for engagement with the contact-points of the armature, a reversible motor electrically connected with the contact-brushes, a switch-throwing device actuated by said motor, and switch-coupling mechanism in engagement with the switch-throwing device and the switch for actuating the latter.

9. In an electric switch-throwing mechanism, a contact-making device, interposed in the main circuit, a circuit-changer having a squared core-magnet electrically connected with the contact-making device and the main circuit, a squared armature movable in the core-magnet and having an insulated arm provided with contact-points, a plurality of contact-brushes electrically connected to one another and adapted for engagement with the contact-points of the armature, a reversible motor electrically connected with the contact-brushes, a switch-throwing device actuated by said motor, switch-coupling mechanism in engagement with the switch-throwing device and the switch for actuating the latter, and adjustable stops for limiting the movement of the switch-throwing device.

10. In an electric switch-throwing mechanism, a contact-making device interposed in the main circuit, a circuit-changer having a squared core-magnet electrically connected with the contact-making device and the main circuit, a squared armature movable in the core-magnet and having an insulated arm provided with contact-points, a plurality of contact-brushes electrically connected to one another and adapted for engagement with the contact-points of the armature, a reversible motor electrically connected with the contact-brushes, a switch-throwing device actuated by said motor, switch-coupling mechanism in engagement with the switch-throwing device and the switch for actuating the latter, adjustable stops for limiting the movement of the switch-throwing device, and a circuit-breaker connected with the contact-brushes and automatically actuated by the switch-throwing mechanism.

11. In a switch-thrower of the class described, a contact-making device interposed in the main circuit, a circuit-changer electrically connected with said contact-making device and the main circuit, a motor electrically connected with the circuit-changer, a switch-throwing device involving a worm-gear, a movable member controlled by the latter, a trip-arm actuated by said member and connected to the switch for operating the same, and means for regulating the same.

12. In a switch-thrower of the class described, a contact-making device interposed in the main circuit, a circuit-changer electrically connected with said contact-making device and the main circuit, a motor electrically connected with the circuit-changer, a switch-throwing device involving a worm-gear, a movable member controlled by the latter, a trip-arm actuated by said member and connected to the switch for operating the same, means for regulating the same, and a circuit-breaker connected with the circuit-changer and the switch-throwing device and automatically actuated by the same.

13. The combination of a trolley-wire, separated conducting-strips associated with the trolley-wire and insulated therefrom and to be traversed by a trolley-wheel, a magnet having an electrical connection with one of said strips, a motor having an electrical connection with the other strip, pole-changing means for the motor operable by said magnet, and connections between the motor and the switch for throwing the latter.

14. The combination of a switch-operating electric motor, pole-changing means for the motor, a magnet for controlling the pole-changing means, and a current-carrying conductor to supply current to the magnet for energizing the same and causing the operation of the pole-changing means.

15. The combination of a reciprocatory power-operated member having a projection, an oscillatory device to be operated by said projection on each stroke of said power-operated member, means for holding the oscillatory device in operative relation with said projection, switch-throwing mechanism operable by said oscillatory member, and electrically-controlled mechanism automatically actuated by said member for cutting off the power.

16. The combination of a reciprocatory power-operated member having a reversible worm-shaft, the terminals of the worm thereof being short of the extent of the shaft, a shiftable member in engagement with the worm and adapted to be actuated thereby, projections on said member, an oscillatory device in engagement with the projections on each stroke of said power-operated member, means for holding the oscillatory device in operative relation with said projections, and switch-coupling mechanism operable by said oscillatory member.

17. In a switch-thrower of the class described, a contact-making device arranged in line with a main circuit, a circuit-changer having a magnet in electrical connection with said contact-making device, a movable armature having yieldable contact-points and controlled by said magnet, a plurality of contact elements for engagement with the contact-points of the armature, at least two of the contact elements in electrical connection with each other, a motor having electrical connection with said contact elements, an automatic governor for controlling the speed of the motor, and mechanism for actuating the switch and operable by the motor.

18. In a switch-thrower of the class described, a contact-making device arranged in line with a main circuit, a circuit-changer having a magnet in electrical connection with said contact-making device, a movable armature having yieldable contact-points and controlled by said magnet, a plurality of contact elements for engagement with the contact-points of the armature, at least two of the contact elements in electrical connection with each other, a motor having electrical connection with said contact elements, an automatic governor for controlling the speed of the motor, mechanism for actuating the switch and operable by the motor, and a circuit-breaker in electrical connection with said circuit-changer and controlled by said switch-operating mechanism.

19. In a switch-thrower of the class described, a contact-making device arranged in a main circuit and insulated therefrom, a circuit-changer having a core-magnet provided with a movable armature and in electrical connection with said contact-making device and the main circuit, switches for said electrical connections, a series of contact elements arranged in the circuit-changer, yieldable contact members carried by the armature for engagement with the said elements for changing the direction of the flow of the current, a motor having electrical connection with said contact elements, switch-coupling mechanism, switch-throwing mechanism operative by the coupling mechanism, said coupling mechanism connected directly to the motor, and an automatic governor controlled by the speed of the motor for regulating the said speed and for cutting off the current to the motor when the same reaches an excessive speed.

20. An electric switch-throwing device for railways comprising a switch-throwing motor, a trolley-wire and a motor supply-bar coöperating with the trolley-wire, circuit-changing mechanism consisting of a solenoid in circuit with said trolley-wire, a movable core-armature operating in said solenoid and carrying contact-making points, and stationary contacts capable of coacting with said movable contact-making points, a part of said stationary contacts being on one side of said movable contact-points and connected to one pole of said motor and the other part of said stationary contacts being on the other side of said movable contact-points and connected to the reverse pole of said motor, said movable contact-points being electrically connected to said motor supply-bar.

21. In combination, a track-switch, a reversible electric motor mechanically connected therewith, a pole-changing switch, a magnet for operating the same, and two contacts arranged to coöperate successively with a trolley-wheel, the first being connected with said magnet, and the second with said motor through said pole-changing switch.

22. In an electrical switch-tongue-throwing mechanism for electric railways, a contact-making device embodying a pair of contacts insulated from each other, a magnet in circuit with the main conductor of the railway and with one of the contacts of said contact-making device, a reversing-motor operatively connected with the switch-tongue for causing the shifting thereof in either direction, a circuit-changer electrically connected with the other of the contacts of the contact-making device and with said motor, the said contacts of said device adapted to be engaged by the traveling contact of the car to bridge the circuit in which is the circuit-changer and motor.

23. An electrical switch-tongue-throwing mechanism for electric railways comprising a contact-making device adapted to be engaged by a traveling contact carried by the car, a magnet in circuit with the main conductor of the railway and with said device, a reversing-motor, a circuit-changer in circuit with said device and motor, and a switch-tongue-throwing mechanism frictionally geared with said motor and operated thereby.

24. An electrical switch-tongue-throwing mechanism for electric railways comprising a magnet in circuit with the main conductor, a contact-making device in circuit with said magnet and adapted to be engaged by a traveling contact carried by the car for bridging the circuit, a reversing-motor, a circuit-changer in circuit with said device and motor, a switch-tongue-throwing mechanism operated by said motor, said contact device provided with means for causing the energizing of the magnet in advance of the operation of the motor and the discontinuing of the operation of the motor in advance of the deënergizing of the magnet.

25. In an electric switch-tongue-throwing mechanism for electric railways, mechanism for throwing the switch-tongue, a reversing-motor for actuating said mechanism in either direction, means electrically connected with the main conductor of the railway for forming the switch-throwing circuit, thereby operating the motor, said means embodying a magnet, a circuit-changer, and a contact-making device the latter engaged by a traveling contact carried by the car for bridging the circuit, the said contact-making device provided with means for causing the energizing of the magnet in advance of the operation of the motor and the discontinuing of the operation of the motor in advance of the deënergizing of the magnet.

26. In an electric switch-tongue-throwing mechanism for electric railways, a reversing-motor, means for frictionally gearing the motor with a switch-tongue for throwing the latter when the motor is operated in either direction, a circuit-forming means controlled by the controller of and operated through a traveling contact carried by the car, said means embodying a contact-making device electrically connected with the main conductor of the line, and a circuit-changer electrically connected to the motor.

27. In combination, a track-switch, a reversible electric motor mechanically connected therewith, a pole-changing switch, a magnet for operating the same, two contacts arranged to coöperate successively with the trolley-wheel, the first being connected with the magnet, and the second with the motor through the pole-changing switch, and means associating with the contacts for causing energizing of the magnet in advance of the operation of the motor and discontinuing the operation of the motor in advance of the deenergizing of the magnet.

28. In an electrical switch-throwing mechanism for electric railways, mechanical means for throwing the switch, a reversible electric motor connected with said means, a pole-changing switch, a magnet for operating the same, two contacts arranged to coöperate successively with a traveling contact carried by the car, one of said contacts being connected with the magnet and the other with said motor through said pole-changing switch, and a circuit-breaker having electrical connections with said pole-changing switch and controlled by the movement of said means.

29. An electrical switch-throwing mechanism for electric railways comprising means for throwing the switch, a reversible electric motor frictionally clutched with said means for operating it, a pole-changing switch, a magnet for operating the same, and a pair of contacts arranged to coöperate successively with a traveling contact carried by the car, or 2 of said contacts being connected with the magnet and the other with said motor through said pole-changing switch.

30. An electrical switch-throwing mechanism for electric railways comprising means for throwing the switch, a reversible electric motor, frictionally clutched with said means for operating it, a pole-changing switch, a magnet for operating the same, and a circuit-breaker electrically connected with said pole-changing switch and automatically operated by said means.

31. An electrical switch-throwing mechanism for electric railways comprising an electric motor for throwing the switch, a pole-changing means for the motor, a magnet for controlling the pole-changing means, circuit-forming means for the motor, electrical connections between the magnet and the source of electrical supply, electrical connections for the motor, and means for energizing the magnet in advance of the operation of the motor and for discontinuing the operation of the motor in advance of the deënergizing of the magnet.

32. In an electrical switch-throwing mechanism for electric railways, a reversible electric motor connected with the switch for throwing it, a pole-changing switch, a magnet for operating the same, a pair of contacts arranged to coöperate successively with a traveling contact carried by the car, one of said contacts connected with the magnet, and the other with said motor through said pole-changing switch, and means for controlling the speed of the motor.

33. In an electric switch-throwing mechanism for electric railways, a magnet in circuit with the main conductor of the line, a pair of contacts arranged to be successively engaged by a traveling contact carried by the car, one of the contacts of said pair of contacts connected with the magnet, a circuit-changer operated by said magnet, a reversible motor in circuit through said circuit-changer with the other contact of said pair, and a switch-tongue-throwing means connected to and operated by the motor.

34. In an electrical switch-throwing mechanism for electric railways, a magnet in circuit with the main conductor of the line, a pair of contacts arranged to be successively engaged by a traveling contact carried by the car, one of the contacts of said pair of contacts connected with the magnet, a circuit-changer operated by said magnet, a reversible motor in circuit through said circuit-changer with the other contact of said pair, means for throwing the switch-tongue, and a frictional clutch mechanism between said means and motor for actuating said throwing means when the motor is operated.

35. In an electrical switch-throwing mechanism for electric railways, a magnet in circuit with the main conductor of the line, a pair of contacts arranged to be succesively engaged by a traveling contact carried by the car, one of the contacts of said pair of contacts connected with the magnet, a circuit-changer operated by said magnet, a reversible motor in circuit through said circuit-changer with the other contact of said pair, a switch-tongue-throwing means connected to and operated by the motor, and means for regulating the movement of said switch-tongue-throwing means.

36. In an electrical switch-throwing mechanism for electric railways, a magnet in circuit with the main conductor of the line, a pair of contacts arranged to be successively engaged by a traveling contact carried by the car, one of the contacts of said pair of contacts connected with the magnet, a circuit-changer operated by said magnet, a reversible motor in circuit through said circuit-changer with the other contact of said pair, means for throwing the switch-tongue, a frictional clutch mechanism between said means and motor for actuating said throwing means when the motor is operated, and means for regulating the movement of the said switch-tongue-throwing means 37. A switch-tongue-throwing mechanism for electric railways comprising a contact-making device interposed in the main conductor and having contact-plates of varying lengths, said plates insulated from one another and adapted to be successively engaged by a traveling contact carried by the car, a circuit-forming means embodying an electromagnet and a circuit-changer, means for connecting the magnet to the main conductor of the line and to said elongated contact-plate, a reversible motor in circuit with said short contact-plate through said circuit-changer, said circuit-changer operated by said magnet, and a switch-tongue-throwing means connected to and operated by the motor.

38. A switch-tongue-throwing mechanism for electric railways comprising the combination with a switch-tongue, of a pair of receptacles arranged in proximity thereto and having removable lids, a conduit leading from one of said receptacles and communicating therewith, a hollow supporting-post communicating with the conduit, a lever-arm arranged within one of said receptacles, connections extending through said receptacles and connected at one end with the switch-tongue and at the other end to one end of said lever-arm, an actuating-rod extending through said conduit and having one end projecting in said post and the other end connected to the other end of said lever-arm, means arranged in said post and connected with said rod for actuating it, a frictional clutch mechanism for operating said means, a reversible motor adapted to actuate the frictional clutch mechanism, a pole-changing switch, a magnet for operating the same, and a pair of contacts arranged to coöperate successively with a traveling contact carried by the car, one of said contacts connected with the magnet, and the other of said contacts connected with said motor through said pole-changing switch, combined with a circuit-wire connection between the magnet and the main conductor of the line.

39. An electrical switch-throwing mechanism for electric railways comprising an electric motor connected with the switch-tongue for throwing it in either direction, a pole-changing switch for said motor controlled by the controller of the car through a traveling contact carried by the car, means for actuating said switch connected with the main conductor, a pair of contacts adapted to be engaged by the traveling contact of the car, one of said contacts connected with the means for actuating the switch and the other of said contacts connected with said motor through said pole-changing switch.

40. An electrical switch-throwing mechanism for electric railways comprising an electric motor connected with the switch-tongue for throwing it in either direction, a pole-changing switch for said motor controlled by the controller of the car through a traveling contact carried by the car, means for actuating said switch connected with the main conductor, a pair of contacts adapted to be engaged by the traveling contact of the car, one of said contacts connected with the means for actuating the switch and the other of said contacts connected with said motor through said pole-changing switch, and electrically-controlled means for automatically breaking the circuit.

41. A switch-tongue-throwing mechanism for electric railways comprising the combination with a switch-tongue, of a pair of receptacles arranged in proximity thereto and having removable lids, a conduit leading from one of said receptacles and communicating therewith, a hollow supporting-post communicating with the conduit, a lever-arm arranged within one of said receptacles, connections extending through said receptacles and connected at one end with the switch-tongue and at the other end to one end of said lever-arm, an actuating-rod extending through said conduit and having one end projecting in said post and the other end connected to the other end of said lever-arm, means arranged in said post and connected with said rod for actuating it, a frictional clutch mechanism for operating said means, a reversible motor adapted to actuate the frictional clutch mechanism, a pole-changing switch, a magnet for operating the same, and a pair of contacts arranged to coöperate successively with a traveling contact carried by the car, one of said contacts connected with the magnet, and the other of said contacts connected with said motor through said pole-changing switch, combined with a circuit-wire connection between the magnet and the main conductor of the line.

In testimony whereof we have hereunto set our hands in presence of two subscribing witnesses.

JOHN N. MAKLEY.
EDWARD F. MANETT.
FRANK M. DANNELLY.

Witnesses:
F. O. KETCHAM,
W. M. HAYNES.